(12) United States Patent
MolavianJazi et al.

(10) Patent No.: US 12,133,180 B2
(45) Date of Patent: Oct. 29, 2024

(54) METHOD AND APPARATUS FOR SELECTIVELY APPLYING THE POWER ADJUSTMENT OF A TRANSMIT POWER CONTROL COMMAND

(71) Applicant: Lenovo (Singapore) Pte. Ltd., New Tech Park (SG)

(72) Inventors: Ebrahim MolavianJazi, Santa Clara, CA (US); Hossein Bagheri, Urbana, IL (US); Hyejung Jung, Northbrook, IL (US); Vijay Nangia, Woodridge, IL (US); Joachim Löhr, Wiesbaden (DE); Ravi Kuchibhotla, Clarendon Hills, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 454 days.

(21) Appl. No.: 17/510,741

(22) Filed: Oct. 26, 2021

(65) Prior Publication Data

US 2022/0046557 A1 Feb. 10, 2022

Related U.S. Application Data

(63) Continuation of application No. 16/794,153, filed on Feb. 18, 2020, now Pat. No. 11,160,028.

(Continued)

(51) Int. Cl.
*H04W 52/36* (2009.01)
*H04L 1/1829* (2023.01)
(Continued)

(52) U.S. Cl.
CPC ......... *H04W 52/365* (2013.01); *H04L 1/1858* (2013.01); *H04W 24/10* (2013.01);
(Continued)

(58) Field of Classification Search
CPC .. H04L 1/858; H04W 52/365; H04W 52/143; H04W 72/23; H04W 72/0446; H04W 72/1268; H04W 24/10
(Continued)

(56) References Cited

U.S. PATENT DOCUMENTS 10,674,558 B2 * 6/2020 Hart .................. H04W 48/20
2015/0319717 A1 * 11/2015 Takaoka ............... H04L 5/001
370/329

(Continued)

OTHER PUBLICATIONS

2gpp ts 38.213 v15.4.0 (Dec. 2018) (Year: 2018).*
3gpp tsg-ran MEETING #82 rp-182720 (Dec. 2018) (Year: 2018).*

*Primary Examiner* — William Nealon
(74) *Attorney, Agent, or Firm* — FIG. 1 Patents

(57) ABSTRACT

A method and apparatus provide for transmitting a transmit power control command associated with a physical uplink shared channel transmission, the physical uplink shared channel transmission repeating over a set of uplink transmission occasions. The physical uplink shared channel transmission is received during the set of uplink transmission occasions, wherein the physical uplink shared channel transmission received during a subset of uplink transmission occasions of the set of uplink transmission occasions corresponds to an adjusted transmit power associated with the transmit power control command.

20 Claims, 5 Drawing Sheets

Related U.S. Application Data

(60) Provisional application No. 62/806,744, filed on Feb. 15, 2019.

(51) Int. Cl.

| | |
|---|---|
| *H04W 24/10* | (2009.01) |
| *H04W 52/14* | (2009.01) |
| *H04W 72/0446* | (2023.01) |
| *H04W 72/1268* | (2023.01) |
| *H04W 72/23* | (2023.01) |
| *H04W 84/04* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ..... *H04W 52/143* (2013.01); *H04W 72/0446* (2013.01); *H04W 72/1268* (2013.01); *H04W 72/23* (2023.01); *H04W 84/042* (2013.01); *H04W 88/02* (2013.01); *H04W 88/08* (2013.01); *H04W 92/02* (2013.01); *H04W 92/10* (2013.01)

(58) Field of Classification Search
USPC .......................................... 370/318
See application file for complete search history.

(56) References Cited

U.S. PATENT DOCUMENTS

| | | | |
|---|---|---|---|
| 2017/0013565 A1* | 1/2017 | Pelletier | H04W 52/146 |
| 2018/0124710 A1* | 5/2018 | Ly | H04L 5/0007 |
| 2021/0282090 A1* | 9/2021 | Zhang | H04W 52/146 |

* cited by examiner

| μ | PUSCH PREPARATION TIME $N_2$ [SYMBOLS] |
|---|---|
| 0 | 10 |
| 1 | 12 |
| 2 | 23 |
| 3 | 36 |

300

| μ | PUSCH PREPARATION TIME $N_2$ [SYMBOLS] |
|---|---|
| 0 | 5 |
| 1 | 5.5 |
| 2 | 11 FOR FREQUENCY RANGE 1 |

| TPC COMMAND FIELD | ADDITIONAL POWER BOOST (dB) | ACCUMULATED $\delta_{PUCCH,b,f,c}$ [dB] |
|---|---|---|
| 0 | 0 | -1 |
| 1 | 0 | 0 |
| 2 | 0 | 1 |
| 3 | 0 | 3 |
| 4 | P | 0 + P |
| 5 | P | 1 + P |
| 6 | P | 3 + P |
| 7 | P | 5 + P |

FIG. 4

METHOD AND APPARATUS FOR SELECTIVELY APPLYING THE POWER ADJUSTMENT OF A TRANSMIT POWER CONTROL COMMAND

FIELD OF THE INVENTION

The present disclosure is directed to a method and apparatus for determining the basis of formulating a triggered power headroom report, and the applicability of the power adjustment associated with a transmit power control command to each of multiple repetitions of a particular transmission, including instances associated with an ultra reliable and low latency type of communication transmission.

BACKGROUND OF THE INVENTION

Presently, user equipment (UE), such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

At any given time, the conditions related to establishing and maintaining a communication connection between the wireless communication device and the network via a particular cell can change as the relationship between the particular wireless communication device and the one or more base stations change. In some of these same and other instances, the degree to which a communication connection can change or the manner in which the communication connection is expected to adapt can be dependent upon the type of communication connection. At least one type of emerging communication connection is identified as an ultra reliable and low latency type of communication, which has usage requirements that have an expected level of performance relative to certain aspects of the communication. For example the response times are expected to support a defined low latency, and a defined allowable bit error rate is expected to support an predetermined level of reliability.

This new type of communication is intended to support applications where significant delays in the responsiveness of the system in relaying communication messages between the user and the systems with which they are communicating would degrade the user experience and/or the reasonable performance of a particular application. Examples of applications that might benefit from communications having reduced latency and higher reliability include autonomous driving applications, remote surgery applications, and immersive online gaming entertainment applications, such as augmented reality or virtual reality type applications, as well as a type of gaming that requires an interaction between a server and a relatively large number of players. Some of these application may be identified as being mission critical that require an uninterrupted, and a robust data exchange in order to perform at an acceptable level. Intended support for such systems has in some instances called for a rethinking of how some communication supporting processes are performed.

For example, one way in which a bit error rate can be reduced is through an increase in transmit power. However an increase in the transmit power of a particular user becomes the potential source for an increase in interference relative to other nearby users. A network typically manages the communications for multiple users of which several may each be interested in applications requiring support for an ultra reliable and low latency form of communication.

The present inventors have recognized that by better managing uplink power control between the various user equipment and the network it may be possible to better support a low latency communication environment intended to support multiple users, where the reliability may be enhanced through the inclusion of changes to the way that power head room reports are determined and communicated, as well as incorporating various mechanisms for providing more robust forms of dynamic power adjustment.

SUMMARY

The present application provides a method of wireless communication at a network entity. The method includes transmitting a transmit power control command associated with a physical uplink shared channel transmission, the physical uplink shared channel transmission repeating over a set of uplink transmission occasions. The physical uplink shared channel transmission is received during the set of uplink transmission occasions, wherein the physical uplink shared channel transmission received during a subset of uplink transmission occasions of the set of uplink transmission occasions corresponds to an adjusted transmit power associated with the transmit power control command.

According to another possible embodiment, a network entity for communicating with a user equipment is provided. The network entity includes a controller, and a transceiver, coupled to the controller. The transceiver transmits a transmit power control command associated with a physical uplink shared channel transmission, the physical uplink shared channel transmission repeating over a set of uplink transmission occasions. The transceiver further receives the physical uplink shared channel transmission during the set of uplink transmission occasions, wherein the physical uplink shared channel transmission received during a subset of uplink transmission occasions of the set of uplink transmission occasions corresponds to an adjusted transmit power associated with the transmit power control command.

These and other objects, features, and advantages of the present application are evident from the following description of one or more preferred embodiments, with reference to the accompanying drawings.

BRIEF DESCRIPTION OF THE DRAWINGS

FIG. 3 is an exemplary table for physical uplink shared channel preparation time for physical uplink shared channel timing capability 2;

FIG. 4 is an exemplary table, which associates a value of separate bit field of a transmit power control command with an additional power boost value and a change to be applied to an accumulated power value;

DETAILED DESCRIPTION OF THE PREFERRED EMBODIMENT(S)

Figures 1, 2:
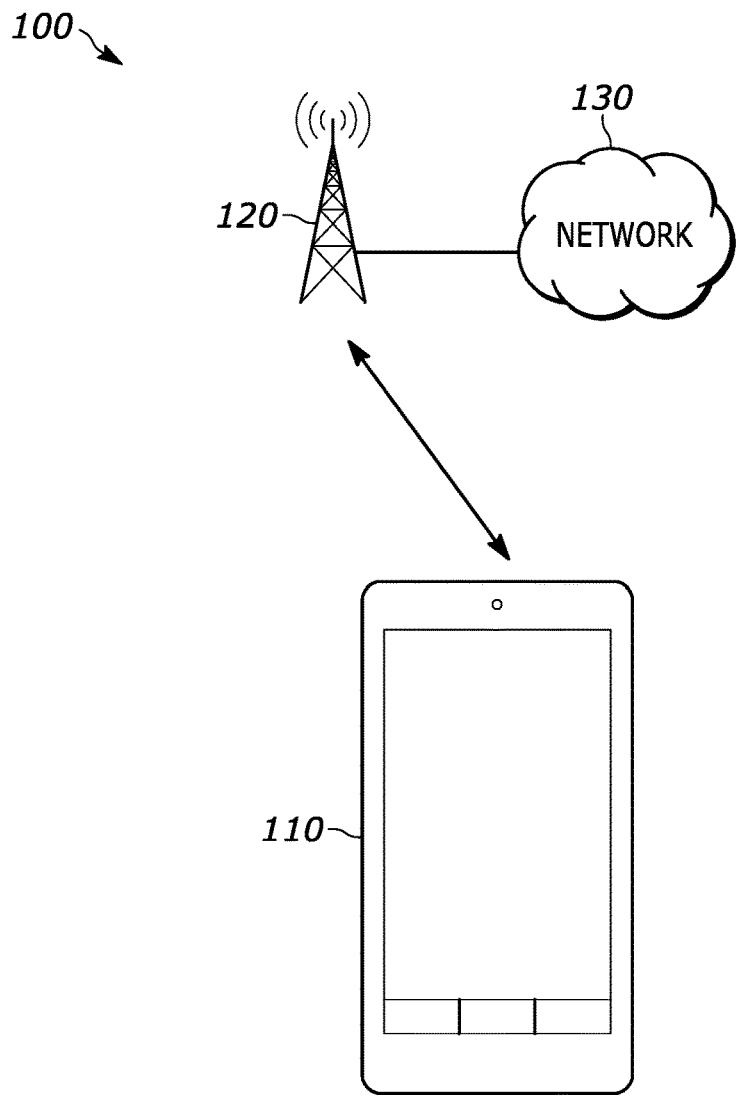
FIG. 1 is a block diagram of an exemplary network environment in which the present invention is adapted to operate.
FIG. 2 is an exemplary table for physical uplink shared channel preparation time for physical uplink shared channel timing capability 1.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for power control and power headroom report enhancements for ultra reliable and low latency communication transmissions.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

Ultra reliable and low latency communications (URLLC) is one of the emerging applications in wireless industry and one of the target services provided by the 3GPP 5G New Radio (NR) standards. At least from physical-layer perspective, at least a couple of distinctions of URLLC relative to the legacy wireless service—enhanced mobile broadband (eMBB)—is having a target block error probability (BLER) requirement which is much lower (e.g., up to 10^-6), higher availability and a shorter target latency requirement (e.g., in the order of 0.5-1 msec). To achieve these more stringent performance requirements for URLLC, new designs meeting increasingly strict operational requirements are needed than corresponding operational requirements needed for eMBB. A basic design has been previously adopted in Rel-15 (mainly channel quality indicator (CQI) and modulation and coding scheme (MCS)—design to achieve reliability up to 10^-5 BLER), and further enhancements are underway in URLLC.

Uplink power control (PC) is among the many elements being considered that are expected can help URLLC to achieve its target requirements. For example, new PC designs may be appropriate to handle inter-UE multiplexing (e.g., between eMBB and URLLC users) and to dynamically boost the power for a URLLC transmission. On the other hand, new designs that are adopted for URLLC in other areas also impact the PC design and call for a revisit of the existing 5G NR power control framework for possible changes and improvements. For example, timing relationships (such as the grant-to-transmission gap timing, and out-of-order scheduling) that are being considered in Rel-15 are being improved for URLLC enhancements to allow faster processing and transmission of URLLC traffic. Consequently, power control and power headroom report (PHR) operations may need to be revisited in view of these new features.

The present application discusses some of the new PC and PHR aspects for URLLC traffic and provides proposals for those new aspects. In particular, proposals included herein attempt to address the following issues:

Timing aspects of power headroom report (PHR) operation for out-of-order scheduling,
  including: whether and/or how to modify the PHR "cut-off time" and possibly the selection of the PUSCH transmission that carries the PHR Power control changes for inter-UE multiplexing
  including: mechanisms for dynamic power boosting via TPC command indication, etc.

The proposals are mainly described in the context of 3GPP 5G NR Rel-16, but can be applied to other releases of 5G NR and other wireless technologies as well.

Changes to Power Headroom Report (PHR)

Out-of-Order Scheduling

Note: Throughout this disclosure, when discussing timing relationships (e.g., earlier/later than, earliest/latest, between, etc.) for an uplink (UL) downlink control information (DCI), the intention is to denote the reception time of, for example the first symbol or the last symbol of a physical downlink control channel (PDCCH) that carries that UL DCI, or higher layer signaling, if applicable. This applies to dynamically scheduled UL transmissions, and/or semi-persistent and/or aperiodic UL transmission, configured grant (e.g., Type-1 or Type-2), etc. In a similar note, when discussing timing relationships (e.g., earlier/later than, earliest/latest, between, etc.) for an UL transmission (physical uplink shared channel (PUSCH)/physical uplink control channel (PUCCH)/sounding reference signal (SRS)/physical random access channel (PRACH), the intention is to denote the transmission time of (e.g., first symbol or last symbol) of an UL transmission occasion.

New timing relationships are being considered for enhancing URLLC performance in 5G NR Rel-16. In particular, the grant-to-transmission gap timing (i.e., the number of symbols/slots after receiving an UL grant DCI and before making an uplink transmission) may allow out-of-order scheduling for URLLC, such that, within a serving cell/uplink carrier, a later grant can schedule an earlier transmission compared to another earlier grant whose uplink transmission will occur later than the transmission scheduled by the later grant. In other words, a second uplink grant DCI and the corresponding transmission (for a URLLC traffic) can both occur—that is, sandwiched—between a first uplink grant DCI and the corresponding transmission for an eMMB type of traffic. Such a feature may not be allowed in 5G NR Rel-15, but is considered to be supported for Rel-16, as can be seen in the following agreed upon excerpt related to a prior proposal.

(3GPP RAN1 AH-1901)

For supporting the out-of-order PDSCH-to-HARQ and PDCCH-to-PUSCH between two hybrid automatic repeat request (HARQ) processes on the active bandwidth part (BWP) of a given serving cell, the companies are encouraged to perform further analysis, including at least the following aspects:

The details of the dropping rules if allowed

The conditions (if any) under which the UE is expected to process the out-of-order channels It can be verified that such an out-of-order scheduling between two dynamically scheduled uplink transmissions does not impact the power control framework, including the TPC command accumulation, since out-of-order processing of TPC commands between a configured grant PUSCH transmission and another dynamically scheduled PUSCH transmission is already supported in Rel-15.

However, for power headroom report (PHR), new procedures in terms of timing may be beneficial.

Timing Aspects of PHR

In LTE, for PHR in carrier aggregation (CA) operation, because of the fixed legacy timeline of n+4 (i.e., a PUSCH transmission occurs 4 subframes after an UL grant DCI is received at subframe index n), actual/virtual PHR is simply defined based on whether there exists a PUSCH transmission or not in the subframe where PHR is reported.

However, re-use of this mechanism for NR may be problematic, due to timeline flexibility in NR: where the grant-to-transmission gap timing, referred to as slot-offset k2, belongs to a predefined/default set or is semi-statically configured to the user equipment (UE) and whose actual value is dynamically indicated in the time domain allocation part of the UL grant DCI. Therefore, determining whether a transmission occurs in a certain time slot depends on the time instance when the UE receives the UL grants DCIs (for dynamically scheduled grants). Accordingly, requiring the UE to fully determine all scheduled transmissions at a certain slot implies a "relatively tighter timeline situation" that forces the UE to wait until the "last moment" to decide.

To avoid such relatively tighter timeline situations, it was agreed for 5G NR Rel-15 that the UE sets the "PHR cut-off time" as the first UL grant DCI (on any serving cell) following the PHR trigger that schedules a new/initial transmission, so that all overlapping UL transmissions on other cells that are scheduled until or before the PHR cut-off time report actual PHR, while all non-overlapping UL transmissions and all overlapping UL transmissions on other cells that are scheduled after the PHR cut-off time report virtual PHR, such as with respect to a reference format. This is captured in the following text from [TS 38.213].

Excerpt from TS 38.213 Section 7.7 for Power Headroom Report

A UE determines whether a power headroom report for an activated serving cell [11, TS 38.321] is based on an actual transmission or a reference format based on the downlink control information the UE received until and including the PDCCH monitoring occasion where the UE detects the first DCI format 0_0 or DCI format 0_1 scheduling an initial transmission of a transport block since a power headroom report was triggered.

If a UE
  is configured with two UL carriers for a serving cell, and determines a Type 1 power headroom report and a Type 3 power headroom report for the serving cell
the UE
  provides the Type 1 power headroom report if both the Type 1 and Type 3 power headroom reports are based on respective actual transmissions or on respective reference transmissions
  provides the power headroom report that is based on a respective actual transmission if either the Type 1 report or the Type 3 report is based on a respective reference transmission If a UE is configured with a secondary cell group (SCG) and if phr-ModeOtherCG for a cell group (CG) indicates 'virtual' then, for power headroom reports transmitted on the CG, the UE computes PH assuming that the UE does not transmit PUSCH/PUCCH on any serving cell of the other CG.

In addition, when computing an actual PHR in carrier aggregation (CA) operation, the UE considers all UL grants on all serving cells whose corresponding PUSCHs overlap with the PUSCH that carries PHR and are scheduled before the PHR cut-off time (i.e., the first UL grant after PHR time), where the computation is mainly in terms of how maximum power reduction (MPR)/additional-maximum power reduction (A-MPR) and the corresponding Pcmax values are calculated (e.g., for the case of intra-band CA, where MPR/A-MPR are calculated jointly across component carriers (CC). Therefore, MPR/A-MPR and therefore Pcmax are NOT calculated based on the PUSCH transmissions which are scheduled after the PHR cut-off time (again due to timeline reasons for computing MPR/A-MPR). This is captured in the following text of [TS 38.213].

Excerpt from TS 38.213 Section 7.7.1 for Type-1 PHR

If a UE is configured with multiple cells for PUSCH transmissions, the UE does not consider for computation of a Type 1 power headroom report in a first PUSCH transmission that includes an initial transmission of transport block on active UL BWP $b_1$ of carrier $f_1$ of serving cell $c_1$, a second PUSCH transmission on active UL BWP $b_2$ of carrier $f_2$ of serving cell $c_2$ that overlaps with the first PUSCH transmission if the second PUSCH transmission is scheduled by a DCI format 0_0 or a DCI format 0_1 in a PDCCH received in a second PDCCH monitoring occasion, and
  the second PDCCH monitoring occasion is after a first PDCCH monitoring occasion where the UE detects the earliest DCI format 0_0 or DCI format 0_1 scheduling an initial transmission of a transport block after a power headroom report was triggered In the late stages of 5G NR Rel-15, 3GPP RAN2 working group decided that configured grant (CG) uplink transmission can be also used to transmit the PHR MAC-CE, in the case that a CG PUSCH that can accommodate PHR transmission occurs earlier than any other dynamically scheduled PUSCH transmission. A key issue when adopting CG-PUSCH to transmit the PHR was to decide on the PHR cut-off time for the case of CG-PUSCH since in this case, there is no corresponding UL grant DCI. It was previously agreed that, for the case of CG-PUSCH, the PHR cut-off time is defined as the starting symbol of CG-PUSCH minus the minimum PUSCH processing/preparation procedure time as defined in [TS 38.214]. These decisions are captured in the following specifications text from [TS 38.321] and the corresponding RAN2 communications.

Excerpt from TS 38.321 Section 6.1.3.9 for Power Headroom Reporting

The MAC entity determines whether PH value for an activated Serving Cell is based on real transmission or a reference format by considering the configured grant(s) and downlink control information which has been received until and including the PDCCH occasion in which the first UL grant for a new transmission is received since a PHR has been triggered if the PHR MAC CE is reported on an uplink grant received on the PDCCH or until the first uplink symbol of PUSCH transmission minus PUSCH preparation time as defined in subclause 6.4 of TS 38.214 if the PHR MAC CE is reported on a configured grant.

From CR R2-1818803 of RP-182658:
Clarification on PHR Timing for Configured Grant The MAC entity determines whether PH value for an activated Serving Cell is based on real transmission or a reference format by considering the configured grant(s) and downlink control information which has been received until and including the PDCCH occasion in which the first UL grant for a new transmission is received since a PHR has been triggered if the PHR MAC CE is reported on an uplink grant received on the PDCCH or until the first uplink symbol of PUSCH transmission minus PUSCH preparation time as defined in subclause 6.4 of TS 38.214 if the PHR MAC CE is reported on a configured grant.

From LS-out R2-1818807 LS on PHR Timing

RAN2 noticed current PHR timing only covers dynamic grant with DCI, however it should be possible to send PHR via configured grant as well.

RAN2 would like to inform RAN1 that RAN2 made the following agreement on PHR timing:

The MAC entity determines whether PH value for an activated Serving Cell is based on real transmission or a reference format by considering the configured grant(s) and downlink control information which has been received until and including the PDCCH occasion in which the first UL grant for a new transmission is received since a PHR has been triggered if the PHR MAC CE is reported on an uplink grant received on the PDCCH or until the first uplink symbol of PUSCH transmission minus PUSCH preparation time as defined in subclause 6.4 of TS 38.214 if the PHR MAC CE is reported on a configured grant.

RAN2 understood the timing for determining real or virtual PH is also captured in physical layer specification, thus we would like to ask RAN1 to update the corresponding text accordingly.

A further subtlety on the PHR cut-off time for CG-PUSCH in terms of the minimum PUSCH processing/preparation procedure time as defined in [TS 38.214] is that this timing only applies to dynamically scheduled PUSCH transmissions, so further details (such as clarification on BWP switching time, etc.) would be beneficial for the case of CG-PUSCH to ensure that the CG-PUSCH is the first/earliest UL resource for a new transmission only after the latest possible overriding physical downlink control channel (PDCCH) occasion. A possible solution was brought as a change request (CR) to 3GPP RAN Plenary #82 (Dec. 2018), as copied below, but it was not agreed. It is expected that those changes get discussed and approved in 3GPP RAN1 #96 (Feb. 2019). As for clarification of the details of the minimum PUSCH processing/preparation procedure time, the corresponding specifications text is also copied below from [TS 38.214].

Excerpt from RAN Plenary Minutes RAN #82

| RP-182658 | NR related CRs, part 10 | RAN2 |

Replaces
The document was approved.

| RP-182720 | PHR timing for configured grant | Nokia, Nokia Shanghai Bell, Lenovo, Motorola Mobility |

Replaces RP-182706 company CR; this CR (for a RAN1 TS) is related to CR R2-1818803 of RP-182658 and late LSout R2-1818807 (was only sent to RAN1); it was found in an offline discussion that a corresponding RAN1 38.213 CR is missing/needed; this CR is provided here in RP-182720

Nokia: 2 options: either approve RAN1 CR here (fixes could still be done) or kick it back to RAN1 (but then RAN1 and RAN2 specs are then misaligned for 1 quarter) LG: timing calculation is usually done in RAN1 ZTE: CR was discussed on RAN1 reflector and some companies have still technical concerns on this Intel: yes, has the same view as ZTE and suggest to solve it in next RAN1 meeting Nokia: we prefer to keep the RAN2 part approved and solve the RAN1 part in March 19 Huawei: the question is what would be the consequence of this approach? If there is a serious impact on the system we should spend efforts to solve this. Nokia: it seems the corresponding RAN1 experts are not here The document was postponed.

From the CR Enclosed in RP-182720

A UE determines whether a power headroom report for an activated serving cell [11, TS38.321] is based on an actual transmission or a reference format based on the configured grant(s) and downlink control information the UE received until and including the PDCCH monitoring occasion where the UE detects the first DCI format 0_0 or DCI format 0_1 scheduling an initial transmission of a transport block since a power headroom report was triggered if the power headroom report is reported on a PUSCH triggered by an uplink grant received on the PDCCH or until the first uplink symbol of PUSCH transmission minus PUSCH preparation time as defined in subclause 6.4 of TS 38.214 [6] if the power headroom report is reported on a configured grant.

For the purpose of power headroom reporting $T_{proc,2}$ is based on $\mu_{DL}$ corresponding to the subcarrier spacing of the active downlink BWP of its scheduling cell and assuming $d_{2,1}=1$, $d_{2,2}=0$ if the power headroom report is transmitted on a configured grant.

If a UE is configured with multiple cells for PUSCH transmissions, the UE does not consider for computation of a Type 1 power headroom report in a first PUSCH transmission that includes an initial transmission of transport block on active UL BWP $b_1$ of carrier $f_1$ of serving cell $c_1$ a second PUSCH transmission on active UL BWP $b_2$ of carrier $f_2$ of serving cell $c_2$ that overlaps with the first PUSCH transmission if the second PUSCH transmission is scheduled by a DCI format 0_0 or a DCI format 0_1 in a PDCCH received in a second PDCCH monitoring occasion, and the second PDCCH monitoring occasion is after a first PDCCH monitoring occasion where the UE detects the earliest DCI format 0_0 or DCI format 0_1 scheduling an initial transmission of a transport block after a power headroom report was triggered or after the first uplink symbol of PUSCH transmission minus PUSCH preparation time as defined in subclause 6.4 of TS 38.214 [6] if the first PUSCH transmission is on a configured grant Excerpt from TS 38.214 Section 6.4 for UE PUSCH Preparation Procedure Time 6.4 UE PUSCH Preparation Procedure Time If the first uplink symbol in the PUSCH allocation for a transport block, including the DM-RS, as defined by the slot offset $K_2$ and the start and length indicator SLIV of the scheduling DCI, is no earlier than at symbol $L_2$, where $L_2$ is defined as the next uplink symbol with its CP starting $T_{proc,2} = \max((N_2+d_{2,1})(2048+144)\cdot\kappa 2^{-\mu}\cdot T_c, d_{2,2})$ after the end of the last symbol of the PDCCH carrying the DCI scheduling the PUSCH, then the UE shall transmit the transport block.

- $N_2$ is based on $\mu$ of Table 6.4-1 and Table 6.4-2 (reproduced as FIGS. 2 and 3) for UE processing capability 1 and 2 respectively, where $\mu$ corresponds to the one of ($\mu_{DL}$, $\mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and $\kappa$ is defined in subclause 4.1 of [4, TS 38.211].
- If the first symbol of the PUSCH allocation consists of DM-RS only, then $d_{2,1}=0$, otherwise $d_{2,1}=1$.
- If the UE is configured with multiple active component carriers, the first uplink symbol in the PUSCH allocation further includes the effect of timing difference between component carriers as given in [11, TS 38.133].
- If the scheduling DCI triggered a switch of BWP, $d_{2,2}$ equals to the switching time as defined in [11, TS 38.133], otherwise $d_{2,2}=0$.
- If the PUSCH indicated by the DCI is overlapping with one or more PUCCH channels, then the transport block is multiplexed following the procedure in subclause 9.2.5 of [9, TS 38.213], otherwise the transport block is transmitted on the PUSCH indicated by the DCI.

Otherwise the UE may ignore the scheduling DCI.

The value of $T_{proc,2}$ is used both in the case of normal and extended cyclic prefix.

Another aspect for PHR operation is to clarify the PUSCH transmission that carries the PHR. In general, it is understood that the UE should transmit the PHR as soon as PHR is triggered and the UE has uplink resources available for transmitting the PHR. For example, in terms of logical channel prioritization (LCP) procedure and transport block (TB) size, processing timeline, etc., the UE should use the earliest available/possible PUSCH transmission to transmit the PHR. For example, this was a main reason why changes in the late stages of 5G NR Rel-15 specifications time period were adopted that would allow/enforce the UE to transmit the PHR on a configured grant PUSCH (CG-PUSCH) if that CG-PUSCH resource occurs earlier in time than any other/the first dynamically scheduled PUSCH transmission after the PHR trigger.

On the other hand, it is usually assumed that PHR is not very time critical. Therefore, even though there is normative text in [TS 38.321] saying that:

"If the MAC entity has UL resources allocated for a new transmission the MAC entity shall, . . . , if the Power Headroom reporting procedure determines that at least one PHR has been triggered and not cancelled; and if the allocated UL resources can accommodate the MAC CE for PHR which the MAC entity is configured to transmit, plus its subheader, as a result of LCP as defined in subclause 5.4.3.1, . . . , instruct the Multiplexing and Assembly procedure to generate and transmit the Multiple/Single Entry PHR MAC CE as defined in subclause 6.1.3.9/6.1.3.8 based on the values reported by the physical layer";

it is not really/precisely specified in which PUSCH the PHR MAC CE is included. This specification text is intentionally formulated a bit imprecise so that it leaves some freedom for the UE implementation where to transmit the PHR MAC CE, such as for example, which PUSCH resource to use for PHR MAC CE inclusion. This has been also confirmed in a 3GPP RAN2 meeting (common understanding among companies in RAN2). For the scheduling performance, it is not very important on what exact PUSCH resource the PHR MAC CE is transmitted as long as it is clear to the eNB/gNB what information (e.g. DCI, CG PUSCH allocations, TPC commands) UE used for the calculation of the PHR. The network needs to know on what basis the PHR calculation was done.

In practice, the UE typically knows based on DCI reception whether UL resources are available. Therefore, typically when DCI (granting UL resources for initial transmission) is received after PHR triggering condition is fulfilled, then UE includes PHR MAC CE in the PUSCH which is associated to this DCI (as long as TB size allows to include PHR MAC CE) per the following clause: "if the allocated UL resources can accommodate the MAC CE for PHR which the MAC entity is configured to transmit, plus its subheader, as a result of LCP as defined in subclause 5.4.3.1". In other words, the UE has to decide before starting LCP for a PUSCH allocation whether to include a PHR MAC CE or not.

PHR trigger conditions and PHR procedure, such as which PUSCH to use for multiplexing PHR, are specified in the following text from [TS 38.321].

Excerpt from TS 38.321 Section 5.4.6 for Power Headroom Reporting 5.4.6 Power Headroom Reporting The Power Headroom reporting procedure is used to provide the serving gNB with the following information:

- Type 1 power headroom: the difference between the nominal UE maximum transmit power and the estimated power for UL-SCH transmission per activated Serving Cell;
- Type 2 power headroom: the difference between the nominal UE maximum transmit power and the estimated power for UL-SCH and PUCCH transmission on SpCell of the other MAC entity (i.e. E-UTRA MAC entity in EN-DC case only);
- Type 3 power headroom: the difference between the nominal UE maximum transmit power and the estimated power for SRS transmission per activated Serving Cell.

RRC controls Power Headroom reporting by configuring the following parameters:
  phr-PeriodicTimer;
  phr-ProhibitTimer;
  phr-Tx-PowerFactorChange;
  phr-Type2OtherCell;
  phr-ModeOtherCG;
  multiplePHR.

A Power Headroom Report (PHR) shall be triggered if any of the following events occur:

phr-ProhibitTimer expires or has expired and the path loss has changed more than phr-Tx-PowerFactorChange dB for at least one activated Serving Cell of any MAC entity which is used as a pathloss reference since the last transmission of a PHR in this MAC entity when the MAC entity has UL resources for new transmission;

NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between.

phr-PeriodicTimer expires;

upon configuration or reconfiguration of the power headroom reporting functionality by upper layers, which is not used to disable the function;

activation of an SCell of any MAC entity with configured uplink;

addition of the PSCell (i.e. PSCell is newly added or changed);

phr-ProhibitTimer expires or has expired, when the MAC entity has UL resources for new transmission, and the following is true for any of the activated Serving Cells of any MAC entity with configured uplink:

there are UL resources allocated for transmission or there is a PUCCH transmission on this cell, and the required power backoff due to power management (as allowed by P-MPR$_c$ as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.

NOTE 2: The MAC entity should avoid triggering a PHR when the required power backoff due to power management decreases only temporarily (e.g. for up to a few tens of milliseconds) and it should avoid reflecting such temporary decrease in the values of $P_{CMAX,f,c}$/PH when a PHR is triggered by other triggering conditions.

If the MAC entity has UL resources allocated for a new transmission, the MAC entity shall:

1> if it is the first UL resource allocated for a new transmission since the last MAC reset:

2> start phr-PeriodicTimer;

1> if the Power Headroom reporting procedure determines that at least one PHR has been triggered and not cancelled; and 1> if the allocated UL resources can accommodate the MAC CE for PHR which the MAC entity is configured to transmit, plus its subheader, as a result of LCP as defined in subclause 5.4.3.1:

2> if multiplePHR is configured:

3> for each activated Serving Cell with configured uplink associated with any MAC entity:

4> obtain the value of the Type 1 or Type 3 power headroom for the corresponding uplink carrier as specified in subclause 7.7 of TS 38.213 [6];

4> if this MAC entity has UL resources allocated for transmission on this Serving Cell; or 4> if the other MAC entity, if configured, has UL resources allocated for transmission on this Serving Cell and phr-ModeOtherCG is set to real by upper layers:

5> obtain the value for the corresponding $P_{CMAX,f,c}$ field from the physical layer.

3> if phr-Type2OtherCell is configured:

4> if the other MAC entity is E-UTRA MAC entity:

5> obtain the value of the Type 2 power headroom for the SpCell of the other MAC entity (i.e. E-UTRA MAC entity);

5> if phr-ModeOtherCG is set to real by upper layers:

6> obtain the value for the corresponding $P_{CMAX,f,c}$ field for the SpCell of the other MAC entity (i.e. E-UTRA MAC entity) from the physical layer.

3> instruct the Multiplexing and Assembly procedure to generate and transmit the Multiple Entry PHR MAC CE as defined in subclause 6.1.3.9 based on the values reported by the physical layer.

2> else (i.e. Single Entry PHR format is used):

3> obtain the value of the Type 1 power headroom from the physical layer for the corresponding uplink carrier of the PCell;

3> obtain the value for the corresponding $P_{CMAX,f,c}$ field from the physical layer;

3> instruct the Multiplexing and Assembly procedure to generate and transmit the Single Entry PHR MAC CE as defined in subclause 6.1.3.8 based on the values reported by the physical layer.

2> start or restart phr-PeriodicTimer;

2> start or restart phr-ProhibitTimer;

2> cancel all triggered PHR(s).

NOTE 3: For a band combination in which the UE does not support dynamic power sharing, the UE may omit reporting power headroom information for serving cells in the other MAC entity.

Below we discuss exemplary embodiments for PHR timing aspects for the case of out-of-order scheduling, which may be motivated by URLLC traffic, and provide present proposals to handle the PHR cut-off time in that case. Since this is a new topic in 5G NR Rel-16, there is no prior existing solution related to this issue.

Enhancements to Inter UE Multiplexing

UL Pre-Emption Indication

Dynamic multiplexing between eMBB and URLLC traffic in the DL was specified in Rel-15 standard specifications. However, the question as to how to multiplex UL traffic from UE and/or system perspective is still open.

For DLPI (DL pre-emption indication), DCI format 2_1 is used for notifying the physical resource block(s) (PRB(s)) and orthogonal frequency division multiplexing (OFDM) symbol(s) where UE may assume no transmission is intended for the UE.

The following information is transmitted by means of the DCI format 2_1 with cyclic redundancy check (CRC) scrambled by interruption radio network temporary identifier (INT-RNTI):

Pre-emption indication 1, Pre-emption indication 2, . . . , Pre-emption indication N. The size of DCI format 2_1 is configurable by higher layers up to 126 bits, according to Subclause 11.2 of [TS 38.213]. Each pre-emption indication is 14 bits. Interpretation of the 14-bit bitmap is configurable: each bit represents either of one OFDM symbol in the time domain and the full bandwidth part in frequency domain, or two OFDM symbols in the time domain and one half of the bandwidth part in frequency domain. UE behavior upon downlink preemption indication (DLPI) reception is undefined.

As opposed to DLPI where number of resource blocks (RBs) in frequency domain can change abruptly from one symbol to another symbol, in uplink preemption indication (ULPI), such abrupt changes are not desired because of radio frequency (RF) limitations. Also, ULPI is different than DLPI as it is used to avoid UL interference, whereas in DL, gNB has already avoided the DL interference by selecting one out of overlapping/interfering DL transmissions.

UL cancelation (pre-emption) of an eMBB PUSCH transmission has been proposed as a candidate for inter UE multiplexing (e.g., eMBB traffic of UE1 and URLLC traffic of UE2) by others. The scheme has advantage of ensuring latency (and reliability) of the URLLC traffic by timely muting the eMBB traffic of another UE. The scheme can also be advantageous to eMBB UEs by letting them be scheduled over a wide bandwidth (instead of semi-static bandwidth split between URLLC UEs and eMBB UEs) and only get muted if needed. However, there are costs and disadvantages associated with the scheme: (a) The UL cancelation indication (if explicitly indicated) may need to be monitored quite frequently (at least when the UE has unacknowledged UL eMBB transmission or configured wideband SRS transmission) in a timely manner to be helpful in ensuring latency of URLLC UEs; (b) the UL cancelation indication should have a high reliability; (c) UL cancelation indication can incur control overhead; (d) there could be eMBB UEs in a cell that are not capable of performing UL cancelation operation, which could hurt the URLLC performance if overlap. UL cancelation has been proposed with different flavors: for instance, completely canceling eMBB PUSCH, resuming eMBB PUSCH after canceling a part of PUSCH, pausing eMBB PUSCH for a period of time or rescheduling eMBB PUSCH.

An alternative scheme for inter UE multiplexing, can include boosting transmission power of URLLC UEs (in case of overlapping eMBB transmission of other UEs). However, power boosting may not be applicable to power limited UEs or may lead to increased inter cell interference. A combination of UL cancelation (with some relaxation of cancelation indication e.g., in terms of timeline, and monitoring frequency) and power boosting may also be used to address inter UE multiplexing.

In some cases, using an UL cancelation indication may be possible: for instance, when all active eMBB UEs in a cell are capable of UL cancelation operation or when eMBB UEs that are not capable of UL cancelation operation are given non-overlapping resources with URLLC UEs) or when eMBB UEs can also have URLLC traffic (and hence would monitor for URLLC DCI) or when a hybrid cancelation-power boosting technique is used.

Enhanced UL Power Control

Enhanced UL power control is considered as one potential enhancement for UL inter-UE Tx prioritization/multiplexing. The potential enhanced UL power control may include the UE determining the power control parameter set (e.g. $P_0$, alpha) based on scheduling DCI indication without using SRI, or based on group-common DCI indication. Increased TPC range compared to Rel-15 may also be considered. Power boosting is not applicable to power limited UEs.

PUSCH Repetitions

In addition to slot-aggregation defined in NR Rel-15, wherein the same TB is repeated over the same frequency and symbol indices in multiple slots, for URLLC, other TB repetition schemes with smaller delay have been proposed.

At least for scheduled PUSCH, for the option "One UL grant scheduling two or more PUSCH repetitions that can be in one slot, or across slot boundary in consecutive available slots" (also called as "mini-slot based repetitions"), if supported, can further consist of:
  Time domain resource determination
    The time domain resource assignment field in the DCI indicates the resource for the first repetition.
    The time domain resources for the remaining repetitions are derived based at least on the resources for the first repetition and the UL/DL direction of the symbols.
      for further study (FFS) the detailed interaction with the procedure of UL/DL direction determination
    Each repetition occupies contiguous symbols.
    FFS whether/how to handle "orphan" symbols (the # of UL symbols is not sufficient to carry one full repetition)
  Frequency hopping (at least 2 hops)
    Support at least inter-PUSCH-repetition hopping and inter-slot hopping
    FFS other frequency hopping (FH) schemes
    FFS number of hops larger than 2
  FFS dynamic indication of the number of repetitions
  FFS DMRS sharing
  FFS TBS determination (e.g. based on the whole duration, or based on the first repetition)

At least for scheduled PUSCH, for the option "One UL grant scheduling two or more PUSCH repetitions in consecutive available slots, with one repetition in each slot with possibly different starting symbols and/or durations" (also called "multi-segment transmission"), if supported, it further consists of:
  Time domain resource determination
    The time domain resource assignment field in the DCI indicates the starting symbol and the transmission duration of all the repetitions.
      FFS multiple SLIVs indicating the starting symbol and the duration of each repetition
      FFS details of SLIV, including the possibility of modifying SLIV to support the cases with S+L>14.
    FFS the interaction with the procedure of UL/DL direction determination
  For the transmission within one slot,
    If there are more than one UL period within a slot (where each UL period is the duration of a set of contiguous symbols within a slot for potential UL transmission as determined by the UE)
      One repetition is within one UL period.
        FFS if more than one UL period is used for the transmission (If more than one UL period is used, this would override the previous definition of this option.)
        Each repetition occupies contiguous symbols
    Otherwise, a single PUSCH repetition is transmitted within a slot following Rel-15 behavior.
  Frequency hopping
    Support at least inter-slot FH
    FFS other FH schemes
  FFS TBS determination (e.g. based on the whole duration, or based on the first repetition, overhead assumption)

SRS Switching

From 38.331, srs-SwitchFromServCellIndex Indicates the serving cell whose UL transmission may be interrupted during SRS transmission on a PUSCH-less cell. During SRS transmission on a PUSCH-less cell, the UE may temporarily suspend the UL transmission on a serving cell with PUSCH in the same CG to allow the PUSCH-less cell to transmit SRS.

PHR Enhancements for Out-of-Order Scheduling

As was previously mentioned above, for power headroom report (PHR) in CA operation, it may be beneficial to clarify how actual/virtual PHR are determined, i.e., what is the PHR cut-off time for which overlapping UL transmissions that are scheduled until or before the PHR cut-off time actual PHR is reported, while all non-overlapping UL transmissions and all overlapping UL transmissions that are scheduled after the PHR cut-off time virtual PHR are reported. It was also noted that, the UE is generally supposed to transmit the PHR on the earliest available/possible PUSCH transmission after PHR trigger (in both single-cell operation and CA operation).

In all embodiments, examples, and texts throughout this disclosure, an "earlier" UL/PUSCH transmission can refer to an UL/PUSCH transmission that starts earlier in time or ends earlier in time or both. Similarly, the "earliest" UL/PUSCH transmission among a number of UL/PUSCH transmissions refers to a PUSCH transmission that starts the earliest in time or ends the earliest in time or both. In an example, the earlier/earliest PUSCH transmission can include repetitions (e.g., mini-slot repetition, or multi-segment transmission) of a TB/UCI (in case of PUSCH without data).

For the case of out-of-order scheduling, however, the earliest available PUSCH after PHR trigger on a serving cell/uplink carrier is not necessarily the first scheduled PUSCH transmission on that serving cell/uplink carrier. Other than the possibility for a CG-PUSCH to be the earliest available PUSCH after PHR trigger, there is also a chance that a second/later DCI may schedule a second PUSCH transmission (e.g., for URLLC) which starts earlier than a first PUSCH transmission (e.g., for eMBB) that is scheduled by a first/earlier DCI following the PHR trigger. It should be clarified whether a delay in transmitting the PHR (i.e., transmitting the PHR on the later PUSCH) is acceptable and/or desirable, or if the UE may need to be forced or allowed to transmit the PHR as early as possible after a PHR trigger. In the latter case, it may need to be also clarified how the PHR cut-off time is (re-)defined, and the impact on the UE processing timeline may need to be identified. Several proposed solutions can be considered as follows.

One can consider the benefits and disadvantages of changing the PHR cut-off time, so that a second earlier PUSCH (than a first PUSCH transmission occasion) that is scheduled later (than the scheduling instance for the first PUSCH transmission occasion) carries the PHR instead of a first later PUSCH that is scheduled later on the same serving cell/ uplink carrier. One potential benefit is that the PHR is conveyed to the network earlier. The other potential benefit is to report the PHR for the "out-of-order" PUSCH, which may be arguably more important and may have higher priority (e.g., the URLLC), instead of reporting the PHR for the "in-order" PUSCH which may be arguably less important and may have lower priority (e.g., the eMBB) that would be reported based on the current/existing PHR cut-off time in Rel-15. One further potential benefit of defining PHR cut-off time based on the earliest PUSCH instead of earliest DCI scheduling of a possibly later PUSCH can be in case of using enhanced UL power control to address inter-UE multiplexing issue. In such a case, if a URLLC UE can report PHR as fast as possible, especially if the PHR shows there is little, zero or negative power headroom left, the gNB can use a different set of resources (e.g., non-overlapping with eMBB) to schedule the URLLC transmission, and use the enhanced power control schemes for the UEs with larger available power headroom.

A further use-case for re-defining the PHR cut-off time is to address the issue of uplink pre-emption that might be supported in 5G NR Rel-16 in the context of URLLC traffic and/or inter-UE multiplexing. On a related note, if the first/earliest DCI following PHR trigger corresponds to a first scheduled PUSCH, and if UL pre-emption of the first scheduled PUSCH is possible, there is a chance that later the UE gets an UL pre-emption indication (UL-PI) for the first scheduled PUSCH (e.g., since the first PUSCH corresponds to an eMBB traffic on a first serving cell which can collide with URLLC traffic on second serving cell from the same UE, or can even collide with URLLC traffic from another UE). It should be clarified when (via which PUSCH) PHR is transmitted, and whether/how the PHR cut-off time is (re-)defined.

In one embodiment, the PHR cut-off time can be the same as if the first scheduled PUSCH is not canceled/preempted: e.g., PHR cut-off time is defined based on the first DCI following PHR trigger or based on first PUSCH minus PUSCH processing time $T_{proc,2}$. Using the same PHR cut-off time can be useful to avoid PHR re-calculation. In an example, the PHR is transmitted on the PUSCH scheduled by a second DCI. However, a potential disadvantage for this option is that, the PHR report does not match the PUSCH transmission which carries the PHR, which can cause confusions at the network.

In another embodiment, the PHR cut-off time can be defined based on the second PUSCH, e.g., based on the second DCI following PHR trigger if UL-PI for the first scheduled PUSCH is sent after "X" symbols from the first DCI; otherwise the PHR cut-off time may be the same as if the first scheduled PUSCH is not canceled. 'X' can be indicated to the UE via e.g., RRC/MAC CE/physical layer signaling or can be a UE capability. In an example, the PHR is transmitted on the PUSCH scheduled by the second DCI.

In another embodiment, the PHR cut-off time can be defined based on the second PUSCH, e.g., based on the second DCI following PHR trigger if the first PUSCH is canceled prior to the reception of the second DCI or the transmission of the second PUSCH minus an offset (e.g., PUSCH processing time).

On the other hand, a change to PHR cut-off time could increase the UE complexity, which may not be very desirable. In addition, a potential disadvantage is that PHR MAC-CE bits might be multiplexed on the URLLC traffic and use its (precious) resources, although PHR may be arguably rather delay-tolerant, so no change may be needed (beyond the CR for the case of CG-PUSCH as mentioned above).

In one example, the following embodiments and solutions on modifying the PHR cut-off time may be limited only to the case that a "high priority PHR trigger" occurs, based on an ordering of priority levels for PHR triggers. In one related example, a PHR trigger based on a significant pathloss change or significant power management/P-MPR change may be considered as a high priority PHR trigger, so modified/more aggressive PHR cut-off times may be applied for such PHR trigger. In another related example, a PHR trigger based on an expiration of periodic PHR timer or activation of an SCell or addition/configuration of a PSCell or (re-)configuration of PHR functionality may be considered as low priority, for which modified/more aggressive PHR cut-off times may not be applied. In one example, the PHR may be transmitted on the serving cell that caused the high priority PHR trigger, regardless of whether or not a PUSCH on that serving cell is the earliest available/possible PUSCH for initial transmission after PHR trigger, and therefore, the PHR cut-off time is set as the reception time for the UL DCI scheduling the PUSCH on that serving cell. In another example, the PHR may be transmitted based on one of the options described in the following in this disclosure.

In one example, the following embodiments and proposed solutions on modifying the PHR cut-off time apply to the case that the UE supports/reports a UE capability for/is configured for out-of-order scheduling and/or URLLC (e.g., based on semi-static configuration and/or UE capability and/or indication of URLLC grant (e.g., CRC scrambled by a specific RNTI (e.g., MCS-C-RNTI), or a URLLC-specific DCI format (e.g., compact DCI format)), indication of URLLC power boosting (e.g., in DCI), etc.).

In an embodiment, if the UE provides a Type 1 power headroom report in a first PUSCH transmission in a slot of a first serving cell, the power headroom report for a second serving cell may be based on an actual transmission (i.e., actual PHR) in the case that PUSCH repetition (via e.g., slot-aggregation as defined in NR Rel-15, or mini-slot repetition, or multi-segment transmission) may be transmitted on the second serving cell with at least one repetition of the PUSCH repetitions overlapping in time with the first PUSCH transmission in the first serving cell.

Conservative PHR Operation (First/Earliest DCI After PHR Trigger)

Embodiment 1: In one embodiment, the PHR cut-off time may be the same as in 5G NR Rel-15, i.e., the first/earliest DCI for an initial transmission after PHR trigger if PHR is transmitted on a dynamically scheduled PUSCH (or first symbol of CG-PUSCH minus PUSCH processing time as defined in [TS 38.214] if PHR is transmitted on a CG-PUSCH). It is understood that for this option, the UE may be allowed to choose a dynamically scheduled PUSCH for carrying the PHR that is not necessarily the earliest dynamically scheduled PUSCH after PHR trigger. Instead, a dynamically scheduled PUSCH that corresponds to the first DCI after PHR trigger (and is possibly transmitted later) may be used to transmit the PHR (provided there is no earlier CG-PUCSH transmission).

Aggressive PHR Operation (Earliest Available/Possible PUSCH After PHR Trigger)

Embodiment 2: In one embodiment, the PHR may be transmitted on the earliest available (or the earliest possible, as discussed below in Note-2) PUSCH transmission for an initial/new transmission that can accommodate the MAC CE for PHR after PHR trigger. Accordingly, if PHR is transmitted on a dynamically scheduled PUSCH for an initial transmission, the PHR cut-off time should correspond to the UL DCI associated with the earliest possible PUSCH transmission for an initial transmission after PHR trigger. Therefore, both [TS 38.213] and [TS 38.321] specifications regarding PHR cut-off time could be updated accordingly, e.g., as follows. It is understood that in this option, the UE should not start the TB generation process/PHR calculation before the latest possible (out-of-order) DCI in the "monitoring/search" time period has been received.

In a related embodiment, if the PHR cut-off time is derived based on the earliest available/possible PUSCH transmission (e.g., in case of configured grant), the earliest available/possible PUSCH transmission may not include a PUSCH transmission on a carrier whose UL transmission may be interrupted during SRS transmission on a PUSCH-less cell at least when SRS is transmitted on the PUSCH-less cell resulting in temporary suspension of the PUSCH transmission.

<START Text Proposal for TS 38.213 Section 7.7>

A UE determines whether a power headroom report for an activated serving cell [11, TS 38.321] is based on an actual transmission or a reference format based on the downlink control information the UE received until and including the PDCCH monitoring occasion where the UE detects a DCI format 0_0 or DCI format 0_1 scheduling an earliest initial transmission of a transport block since a power headroom report was triggered if the power headroom report is reported on a PUSCH triggered by an uplink grant received on the PDCCH or until the first uplink symbol of PUSCH transmission minus PUSCH preparation time as defined in subclause 6.4 of TS 38.214 [6] if the power headroom report is reported on a configured grant.

For the purpose of power headroom reporting $T_{proc,2}$ is based on $\mu_{DL}$ corresponding to the subcarrier spacing of the active downlink BWP of its scheduling cell and assuming $d_{2,1}=1$, $d_{2,2}=0$ if the power headroom report is transmitted on a configured grant.

If a UE is configured with multiple cells for PUSCH transmissions, the UE does not consider for computation of a Type 1 power headroom report in a first PUSCH transmission that includes an initial transmission of transport block on active UL BWP $b_1$ of carrier $f_1$ of serving cell $c_1$, a second PUSCH transmission on active UL BWP $b_2$ of carrier $f_2$ of serving cell $c_2$ that overlaps with the first PUSCH transmission if the second PUSCH transmission is scheduled by a DCI format 0_0 or a DCI format 0_1 in a PDCCH received in a second PDCCH monitoring occasion, and the second PDCCH monitoring occasion is after a first PDCCH monitoring occasion where the UE detects a DCI format 0_0 or DCI format 0_1 scheduling an earliest initial transmission of a transport block after a power headroom report was triggered or after the first uplink symbol of PUSCH transmission minus PUSCH preparation time as defined in subclause 6.4 of TS 38.214 [6] if the first PUSCH transmission is on a configured grant.

<END Text Proposal for TS 38.213 Section 7.7>

Note-1: The above change to specification for the PHR cut-off time may be sufficient for the case of single entry PHR (i.e., single carrier operation). In such a case, the UE implementation can determine the earliest PUSCH after PHR trigger without any confusion, e.g., as follows.

In one example, once the UE has received a first/earliest UL DCI for initial transmission after PHR trigger, the UE will wait until:
        the first symbol of the PUSCH transmission corresponding to that first/earliest UL DCI after PHR trigger (to be called here "the first PUSCH");
        minus a number of symbols equal to (i) the minimum of one or more of default, common, dedicated configured k2 value (i.e., DCI-to-PUSCH time) in symbols in the PUSCH time domain resource allocation table entries OR (ii) the minimum PUSCH processing/preparation time $T_{proc,2}$ as defined in [TS 38.214] for that serving cell.

Then, during this monitoring/search time period:
        If some UL DCI is received that schedules another PUSCH for initial transmission (to be called here "the second PUSCH") that is earlier than the first PUSCH, the UE will transmit the PHR on the second/earlier PUSCH and will consider the PHR cut-off time as the second/later DCI. In case of multiple such UL DCIs, the earliest PUSCH transmission is used to transmit the PHR and the corresponding UL DCI is considered as the PHR cut-off time.

In an example, the earliest PUSCH transmission includes repetitions (e.g., mini-slot repetition, or multi-segment transmission) of a TB/UCI (in case of PUSCH without data)

If no other UL DCI for initial transmission is received or if all UL DCIs that are received schedule PUSCHs for initial transmissions that are not earlier than the first PUSCH, then UE will transmit the PHR on the first PUSCH and will consider the PHR cut-off time as the earliest DCI.

Provided, in both cases, that there is no earlier configured-grant PUSCH transmission.

In one example, the UE restricts the search for out-of-order scheduled UL DCIs for initial PUSCH transmissions only to the serving cell on which the first UL DCI for initial PUSCH transmission is received.

Note-2: The above proposed change to specification for the PHR cut-off time may or may not be sufficient for the case of multiple entry PHR (i.e., carrier aggregation "CA" operation). Depending on the scenario details, the UE implementation may be able to determine the earliest available PUSCH for initial transmission after PHR trigger without any confusion, or the UE may have ambiguities in determining the earliest PUSCH for initial transmission after PHR trigger, e.g., as captured in the following examples:

In one example, if the values for the minimum of one or more of default, common, dedicated configured DCI-to-PUSCH time k2 across different serving cells are the same (or if the values for the minimum PUSCH processing/preparation time as defined in [TS 38.214] across different serving cells are the same. In some examples, the PUSCH processing/preparation time may be computed assuming the worst case settings for some of the parameters such as $d_{2,1}=1$), then the UE implementation is able to determine the earliest PUSCH after PHR trigger without any ambiguity using the same approach as described above for the single carrier case, since the end time for the "monitoring/search" time period to search for any potential out-of-order UL DCIs for initial PUSCH transmissions on all serving cells may be the same. The PHR cut-off time may also be defined similarly as the DCI for that earliest PUSCH for initial transmission after the PHR trigger.

Embodiment 2-1:

In another example, if the values for the minimum of one or more of default, common, dedicated configured DCI-to-PUSCH time k2 across different serving cells are different (or if the values for the minimum PUSCH processing/preparation time as defined in [TS 38.214] across different serving cells are different. In some examples, the PUSCH processing/preparation time may be computed assuming the worst case settings for some of the parameters such as $d_{2,1}=1$), then the UE may have difficulty to find the earliest available PUSCH transmission after PHR trigger, since out-of-order UL DCIs for initial PUSCH transmissions can be possibly still received on a serving cell even after the "monitoring/search" time period has ended on another serving cell. This is further elaborated in some examples below.

In a related example, the UE may decide too early on a certain PUSCH transmission on a certain serving cell (e.g., a serving cell with large minimum of one or more of default, common, dedicated configured k2 value or with large minimum PUSCH processing/preparation time $T_{proc,2}$) as the earliest available PUSCH for initial transmission after PHR trigger, although there is an earlier PUSCH for initial transmission that is later scheduled on another serving cell (e.g., a serving cell with small minimum of one or more of default, common, dedicated configured k2 value or with small minimum PUSCH processing/preparation time $T_{proc,2}$), so the PHR is not reported on the earliest available PUSCH transmission after PHR trigger.

In another related example, the UE may wait too long to check for potentially earlier PUSCH for initial transmissions after PHR trigger on some serving cells (e.g., serving cells with small minimum of one or more of default, common, dedicated configured k2 value or with small minimum PUSCH processing/preparation time $T_{proc,2}$), but no PUSCH transmission is actually scheduled on those serving cells, while the processing for another PUSCH transmission on another serving cell (e.g., a serving cell with large minimum of one or more of default, common, dedicated configured k2 value or with large minimum PUSCH processing/preparation time $T_{proc,2}$) is already started, so that the opportunity to report PHR on that early PUSCH transmission is lost.

In such cases, it appears that the UE may not be necessarily able to always correctly identify the earliest available PUSCH for initial transmission after PHR trigger. Rather, the UE may need to limit its "monitoring/search" time window and transmit the PHR on the earliest possible PUSCH for initial transmission after PHR trigger. Below, we give two example definitions (Alt-1 and Alt-2) for the earliest possible PUSCH transmission.

<START text proposal for TS 38.213 Section 7.7>

A UE determines whether a power headroom report for an activated serving cell [11, TS 38.321] is based on an actual transmission or a reference format based on the downlink control information the UE received until and including the PDCCH monitoring occasion where the UE detects a DCI format 0_0 or DCI format 0_1 scheduling an earliest possible initial transmission of a transport block since a power headroom report was triggered if the power headroom report is reported on a PUSCH is triggered by an uplink grant received on the PDCCH or until the first uplink symbol of PUSCH transmission minus PUSCH preparation time as defined in subclause 6.4 of TS 38.214 [6] if the power headroom report is reported on a configured grant.

For the purpose of power headroom reporting $T_{proc,2}$ is based on $\mu_{DL}$ corresponding to the subcarrier spacing of the active downlink BW of its scheduling cell and assuming $d_{2,1}=1$, $d_{2,2}=0$ if the power headroom report is transmitted on a configured grant.

Alt-1: "The earliest possible initial transmission of a transport block since a power headroom report was triggered" is defined as the earliest PUSCH transmission occasion for an initial transmission of a transport block that is scheduled [on any serving cell] on or before:

the first symbol of a PUSCH transmission occasion in a serving cell corresponding to the PDCCH monitoring occasion where the UE detects the earliest DCI format 0_0 or DCI format 0_1 scheduling an initial transmission of a transport block since a power headroom report was triggered;

minus the minimum common/dedicated configured k2 value for that serving cell;

provided there is no earlier configured grant transmission.

Alt-2: "The earliest possible initial transmission of a transport block since a power headroom report was triggered" is defined as the earliest PUSCH transmission occasion for an initial transmission of a transport block that is scheduled [on any serving cell] on or before:

the first symbol of a PUSCH transmission occasion in a serving cell corresponding to the PDCCH monitoring occasion where the UE detects the earliest DCI format 0_0 or DCI format 0_1 scheduling an initial transmission of a transport block since a power headroom report was triggered;

minus the minimum PUSCH processing/preparation time as defined in [TS 38.214] for that serving cell;

provided there is no earlier configured grant transmission.

If a UE is configured with multiple cells for PUSCH transmissions, the UE does not consider for computation of a Type 1 power headroom report in a first PUSCH transmission that includes an initial transmission of transport block on active UL BWP $b_1$ of carrier $f_1$ of serving cell $c_1$, a second PUSCH transmission on active UL BWP $b_2$ of carrier $f_2$ of serving cell $c_2$ that overlaps with the first PUSCH transmission if the second PUSCH transmission is scheduled by a DCI format 0_0 or a DCI format 0_1 in a PDCCH received in a second PDCCH monitoring occasion, and the second PDCCH monitoring occasion is after a first PDCCH monitoring occasion where the UE detects a DCI format 0_0 or DCI format 0_1 scheduling an earliest possible initial transmission of a transport block after a power headroom report was triggered or after the first uplink symbol of PUSCH transmission minus PUSCH preparation time as defined in subclause 6.4 of TS 38.214 [6] if the first PUSCH transmission is on a configured grant.

<END Text Proposal for TS 38.213 Section 7.7>

In one example, the UE might restrict the search for out-of-order scheduled UL DCIs for initial PUSCH transmissions only to the serving cell on which the first UL DCI for initial PUSCH transmission is received.

Balanced PHR Operation (Based on UE Capability and/or gNB Configuration on PHR Timeline/Cut-Off Time)

Embodiment 3-1: In one embodiment, how much to delay the decision on the selection of which PUSCH transmission after the PHR trigger to be used for PHR multiplexing is up to a UE capability on PHR timeline reported by the UE and/or gNB configuration or is predetermined and fixed in the specifications. Accordingly, the PHR cut-off time also corresponds to the PUSCH transmission that is selected for PHR transmission based on this UE capability and/or gNB configuration or the predetermined/fixed value in the specifications. The reported UE capability and/or gNB configuration or the predetermined/fixed value in the specifications can be cell-specific (i.e., per serving cell), or per frequency band, or UE-specific (i.e., per UE, across all serving cells), or a combination thereof.

In one example, the UE could report a PHR timeline UE capability as a number of [X] symbols/slots after an UL DCI or as a number of [Y] symbols/slots before a PUSCH transmission to be the latest time by which the UE can decide on which PUSCH transmission to transmit the PHR.

For example, the value of [X] is larger than or equal to zero, and it is smaller than the minimum of one or more of default, common, dedicated configured k2 value for a serving cell (if UE capability is per cell/band) or smaller than the smallest minimum of one or more of default, common, dedicated configured k2 values across all serving cells (if UE capability is per UE). For another example, the value of [Y] is larger than the minimum PUSCH proc/prep time $T_{proc,2}$ as defined in [TS 38.214] and smaller than the minimum of one or more of default, common, dedicated configured k2 value for a serving cell (if UE capability is per cell/band) or smaller than the largest (or smallest in another example) minimum of one or more of default, common, dedicated configured k2 values (in symbols) across all serving cells (if UE capability is per UE). Similarly, the gNB can configure the parameter [X] and/or [Y] as defined above. In one example, the UE reports a PHR timeline UE capability for parameters [X] and/or [Y], and then the network configures parameters [X] and/or [Y] based on the reported UE capability.

In another example, the parameters [X] and/or [Y] are predetermined and fixed in the specifications.

In one example, the PHR timeline/PHR cut-off time (regardless of whether a UE capability and/or gNB configuration or predetermined/fixed in the specifications) can be much less stringent than the (smallest) minimum PUSCH processing/preparation time or the (smallest) minimum of one or more of default, common, dedicated configured k2.

It is understood that in this option, the UE should not start the TB generation process/PHR calculation before the latest possible (out-of-order) DCI in the "monitoring/search" time period per PHR timeline (based on UE capability and/or gNB configuration or predetermined/fixed timing in the specifications) has arrived.

In a related example, once the UE has received a first/earliest UL DCI after PHR trigger that schedules a PUSCH for an initial transmission of a new transport block (to be called here "the first PUSCH"), the UE will start a monitoring/search time period for other potential (out-of-order) UL DCI(s) that schedule initial transmission(s) of new transport block(s) until:

The last symbol of the PDCCH monitoring occasion where the UE detects the first/earliest DCI format 0_0 or DCI format 0_1 scheduling an initial transmission of a transport block since a power headroom report was triggered;

Plus [X] symbols per the reported PHR timeline UE capability.

Then, during this monitoring/search time period:

If some UL DCI is received on any serving cell that schedules another PUSCH for an initial transmission of a new transport block (to be called here "the second PUSCH") that starts earlier (in another example, ends earlier or starts and ends earlier) than the first PUSCH, the UE will transmit the PHR on the second/earlier PUSCH and will consider the PHR cut-off time as the second/later DCI. In case of multiple such UL DCIs, the earliest PUSCH transmission (in another example, the PUSCH transmission that ends the earliest or PUSCH transmission that starts and ends the earliest) is used to transmit the PHR and the corresponding DCI is considered as the PHR cut-off time.

If no other UL DCI is received on any serving cell that schedules another PUSCH for an initial transmission of a new transport block or if all UL DCIs that are received on all serving cells for initial transmission (s) of new transport block(s) schedule PUSCH transmissions that start after the first symbol of the first PUSCH (in another example, PUSCH transmission that ends earlier than the last symbol of the first PUSCH), then the UE will transmit the PHR on the first PUSCH and will consider the PHR cut-off time as the earliest DCI.

Provided, in both cases, that there is no earlier configured-grant PUSCH transmission.

In one example, the UE restricts the search for out-of-order scheduled UL DCIs for initial PUSCH transmissions only to the serving cell on which the first UL DCI for initial PUSCH transmission is received.

In another related example, once the UE has received a first/earliest UL DCI after PHR trigger that schedules a PUSCH for an initial transmission of a new transport block (to be called here "the first PUSCH"), the UE will start a monitoring time period for other potential UL DCI(s) that schedule initial transmission(s) of new transport block(s) until:

The first symbol of the first PUSCH;
Minus [Y] symbols per the reported PHR timeline UE capability.

Then, during this monitoring time period:

If some UL DCI is received on any serving cell that schedules another PUSCH for an initial transmission of a new transport block (to be called here "the second PUSCH") that starts earlier (in another example, ends earlier or starts and ends earlier) than the first PUSCH, the UE will transmit the PHR on the second/earlier PUSCH and will consider the PHR cut-off time as the second/later DCI. In case of multiple such UL DCIs, the earliest PUSCH transmission (in another example, the PUSCH transmission than ends the earliest or PUSCH transmission that starts and ends the earliest) is used to transmit the PHR and the corresponding DCI is considered as the PHR cut-off time.

If no other UL DCI is received on any serving cell that schedules another PUSCH for an initial transmission of a new transport block or if all UL DCIs that are received on all serving cells for initial transmission(s) of new transport block(s) schedule PUSCH transmissions that start after the first symbol of the first PUSCH (in another example, PUSCH transmission that ends earlier than the last symbol of the first PUSCH), then UE will transmit the PHR on the first PUSCH and will consider the PHR cut-off time as the earliest DCI.

Provided, in both cases, that there is no earlier configured-grant PUSCH transmission.

In one example, the UE restricts the search for out-of-order scheduled UL DCIs for initial PUSCH transmissions only to the serving cell on which the first UL DCI for initial PUSCH transmission is received.

In one example, the monitoring/search time window for finding out-of-order initial PUSCH transmission is relaxed, so that PHR cut-off time may be moved to minimum PUSCH preparation time+delta, where delta is a parameter depending on the UE capability and/or gNB configuration or is predetermined and fixed in the specification (e.g.,1 symbol at 15 kHz subcarrier spacing).

Balanced PHR Operation (Based on LCP Timing for PHR Timeline/PHR Cut-Off Time)

Another variant of a balanced solution for PHR operation timeline in the case of out-of-order scheduling is based on LCP timing which is based on UE implementation.

Embodiment 3-2: In one embodiment, PHR cut-off time may be determined at the starting/ending time of the LCP of the PUSCH corresponding to reception time of the first/earliest UL DCI for initial transmission of a transport block after the PHR trigger. If, by that time instance, no new further UL DCI for initial transmission of a transport block is received or some new UL DCI for initial transmission is received but they schedule initial PUSCH transmission occasions that occur later than the PUSCH transmission occasion corresponding to the first UL DCI, then the UE sets the PHR cut-off time as in Rel-15 (i.e., the reception time of the first/earliest UL DCI for initial transmission of a transport block after the PHR trigger). However, if, by that time instance, a new further UL DCI is received that schedules an initial PUSCH transmission occasion that occurs earlier than the PUSCH transmission occasion corresponding to the first/earliest UL DCI, then the earlier PUSCH can be used for PHR transmission and the reception time of the corresponding UL DCI can be used as the PHR cut-off time. In the case of multiple such earlier transmission occasions, the UE uses the earliest PUSCH transmission occasion, and sets the PHR cut-off time based on the reception time of the corresponding UL DCI. (All provided there is no earlier configured grant PUSCH transmission).

Transmitting Multiple PHRs

Embodiment 4: In one embodiment, the UE is allowed to report two/multiple PHRs for an out-of-order scheduling occasion in the case of a new PHR trigger, as described in the following:

1. The MAC entity of the UE has generated a PHR MAC CE for a first PUSCH and transmitted it to the PHY (Layer 1), but has not yet transmitted the first PUSCH which includes the PHR MAC CE.
2. Before phr-PeriodicTimer and phr-ProhibitTimer are restarted or after they are restarted and running, if a new PHR is triggered since the path loss has increased more than phr-Tx-PowerFactorChange dB for at least one activated Serving Cell of any MAC entity which is used as a path loss reference since the last transmission of a PHR in this MAC entity and if the MAC entity has another UL resource for new transmission (i.e., a second PUSCH) which is earlier than the first PUSCH, the UE does not cancel the new triggered PHR but additionally transmits a second actual PHR (based on the second PUSCH transmissions) on the second (URLLC) PUSCH, and taking the PHR cut-off time to be the UL DCI corresponding to the second PUSCH. In one example, the second PUSCH transmission is scheduled by a PDCCH with CRC scrambled by MCS-C-RNTI.
3. Before phr-PeriodicTimer and phr-ProhibitTimer are restarted or after they are restarted and running, if a new PHR is triggered since there are UL resources allocated for transmission (i.e., a second PUSCH) which is earlier than the first PUSCH or there is a PUCCH transmission on an activated serving cell of the MAC entity, and the required power backoff due to power management (as allowed by P-MPR$_c$ as specified in [TS 38.101-1], [TS 38.101-2], and [TS 38.101-3]) for this cell has changed more than phr-Tx-PowerFactorChange dB since the last transmission of a PHR when the MAC entity had UL resources allocated for transmission or PUCCH transmission on this cell, then the UE does not cancel the new triggered PHR but additionally transmits a second actual PHR (based on the second PUSCH transmissions) on the second (URLLC) PUSCH, and taking the PHR cut-off time to be the UL DCI corresponding to the second PUSCH. In one example, the second PUSCH transmission is scheduled by a PDCCH with CRC scrambled by MCS-C-RNTI.

This can allow UE to inform gNB of path loss degradation and/or power management (P-MPR) change quickly when URLLC UL transmission was scheduled.

In another embodiment, such a UE behavior to report two/multiple PHRs for an out-of-order scheduling occasion is allowed regardless of a new PHR trigger, since UL pre-emption/out-of-order scheduling may not happen regularly. In this option, the UE reports two PHR MAC CEs for the case that first DCI/PUSCH is "Pre-empted" by a later DCI. Basically the UE may have already started the TB generation process/PHR calculation when a later (out-of-order) DCI for initial PUSCH transmission is received. In that case, in order not to force the UE to redo the LCP procedure/TB generation, the UE may be allowed to include PHR MAC CE in the PUSCH according to the first received DCI as well as to include an additional (more up-to-date) PHR MAC CE in the second PUSCH associated with the later (out-of-order) received DCI for initial PUSCH transmission (of a transport block). In this case, the gNB will be aware of this (since the gNB has issued the DCIs) and should be able to filter out the first PHR MAC CE.

In an embodiment, the Phr cut-off time can be extended to "t2" (from the cut-off time defined in Rel-15, which can be labeled as "t1"), if the UE receives a PDCCH after "t1" not after the 'x' symbols/seconds.

In another embodiment, the Phr cut-off time can be extended to "t2" (from the cut-off time defined in Rel-15, which can be labeled as "t1" associated with a first PDCCH), if the UE receives a PDCCH canceling (completely or partially (e.g., if more than certain number of symbols of the PUSCH are canceled) preempting) the PUSCH scheduled by the first PDCCH (determining 't1').

In another embodiment, a Phr after triggered, can be sent in a first PUSCH (e.g., corresponding to a first PDCCH and a first cut-off time) and in a second PUSCH (e.g., corresponding to a second PDCCH and a second cut-off time)
  In an example, first and second cut-off times are the same
  In an example, the second cut-off time is determined based on the second PDCCH/PUSCH
  In an example, the phr-prohibit timer is not reset after the first phr transmission but after certain time from the first phr transmission (e.g., to potentially allow additional phr transmissions)

Power Control Enhancement for Inter-UE Multiplexing

To achieve a high reliability, URLLC PUSCH transmission may be repeated multiple times e.g., via mini-slot repetition or multi-segment transmission. Depending on when an eMBB PUSCH of another UE, with overlapping resources with those of the URLLC UE starts, boosting the URLLC UE's transmission power for all repetitions may not be a good idea. Noting that higher URLLC transmit power may lead to inter-cell interference for UEs in neighbor cells, and in slots that URLLC and eMBB UEs do not overlap, there may be no need for the URLLC UE to boost its transmission power. This issue can be more pronounced if the UE uses multiple carriers, and unnecessarily using transmission power on one carrier may lead to dropping of transmission on other carriers (those carriers may also have URLLC traffic not overlapping with any eMBB) due to insufficient remaining power.

In particular, TPC methods are disclosed to enable efficient (e.g., in terms of URLLC decoding performance, URLLC battery consumption, avoiding dropping URLLC traffic on other cells, creating less inter-cell interference etc.) URLLC transmission when URLLC and eMBB UEs are assigned overlapping time/frequency resources. Upon, reception of a special power control command (e.g., a power control command with specific command fields having certain values), the methods include:

1. Determination of a set of power adjustments for multiple mini-slots/segments of URLLC transmission
    a. TPC command indicates for which of the repetitions/mini-slots/segments (or slots corresponding to a segment) the indicated power boost is applicable. In one example, the special additional power boost may be only applied to repetition/mini-slots within the slot corresponding to the received PDCCH with the power boost.
        i. In one example, when UE is configured in TPC accumulation mode, the UE does not accumulate the special TPC, but only the normal TPC command in the DCI. In one example, the special TPC may be a separate bit field (for example, indicate no additional power boost, or a power boost of P dB, where P can be a predetermined value in the specification, or configured by higher layers) than the normal TPC command bit field. In another example, the TPC bit field may be extended to say 3-bits to indicate the additional power boost with certain TPC states, for example as shown in Table 1—the accumulated TPC value corresponding to normal operation is shown which is the value that is accumulated without the additional power boost P dB factor.
        ii. In an example, the special additional power boost may be only applied to repetition/mini-slots to the first scheduled slot. In another example, a field in the special power boost command indicates for which repetitions/segments/mini-slots, the command is applicable, for instance, the field includes the number of repetitions/segments/mini-slots starting from the first repetition/segment/mini-slot. In another example, a one bit indication, indicates if the special power boost is applicable to all of the repetitions/segments/mini-slots or only to the ones in the first scheduled slot/within the slot corresponding to the received PDCCH with the power boost. In another example, if DMRS is shared amongst multiple repetitions/segments/mini-slots, the same transmission power is used for those repetitions/segments/mini-slots. In another example, if repetitions/segments/mini-slots of a PUSCH transmission be allowed to be postponed when conflicting with DL symbols, the special power boost is not applied to the postponed transmissions or alternatively applied to the postponed transmissions only if they are not postponed to a new slot.

A table 400 is illustrated in FIG. 4, which identifies an exemplary association of a value of a separate bit field of a transmit power control command with an additional power boost value and a change which can be applied to an accumulated power value.

A TPC command can indicate power boost (indicated by the special power control command) is disabled for all of the repetitions/mini-slots/segments The special power control command can indicate the same power boost for all repetitions; however, the gNB may send a future TPC command to change the transmission power boost (e.g., de-activate the boost) for the rest of repetitions.
2. Updating the power control adjustment state, "f" in the power control formula (up to maximum allowed value (P_cmax)) if at the previous PUSCH transmission occasion, the transmission power had reached to maximum transmission limit (Pc, max).

Note: According to TS 38.213: the UE, upon reception of a TPC command, may not change the power control adjustment state, "f" in the power control formula if at the previous PUSCH transmission occasion, the transmission power had reached a maximum transmission limit (Pc, max).

If the UE has reached maximum power for active UL BWP b of carrier f of serving cell c at PUSCH transmission occasion $i-i_0$ and $$\sum_{m=0}^{C(D_i)-1} \delta_{PUSCH,b,f,c}(m, l) \geq 0,$$

then $f_{b,f,c}(i,l)=f_{b,f,c}(i-i_0,l)$

In a related embodiment, if at the previous PUSCH transmission occasion, the transmission power had reached a maximum transmission limit (Pc, max), at the current PUSCH transmission occasion, 'f' is
  Updated upon reception of the special power control command;
  Not updated (following Rel-15 rule above); otherwise This disclosure discusses some of the new PC and PHR aspects for URLLC traffic and provides proposals for those new aspects. In particular, proposals are disclosed for the following issues:
  Timing aspects of power headroom report (PHR) operation for out-of-order scheduling,
    including: whether and/or how to modify the PHR "cut-off time" and possibly the selection of the PUSCH transmission that carries the PHR.
  Power control enhancements for inter-UE multiplexing
    including: mechanisms for dynamic power boosting via TPC command indication, etc.

According to some embodiments, PHR timing are as follows:
  Conservative PHR timeline: report PHR on the PUSCH corresponding to earliest DCI (even if it is not the earliest PUSCH). The PHR cut-off time as in Rel-15.
  Aggressive PHR timeline: report PHR on the earliest available/earliest possible PUSCH. The PHR cut-off time is the reception time of the corresponding UL DCI/time-reference.
    "earliest available" means the ultimate earliest. It can be identified without confusion only for the case of same min{k2} or {T_proc,2} equal across all cells
    "earliest possible" can mean the earliest within the best possible monitoring/search time window—which is the min{k2} for the cell that receives the earliest UL grant
    Considering TA aspects:
      If (min{k2}) values are different across cells, then use a function of min{k2} values such as the largest (maximum) value of min{k2}, in determining the earliest PUSCH/the first uplink symbol of the earliest PUSCH, the effect of timing difference between component carriers as given in [TS 38.133] is included.
  Balanced PHR timeline (version 1): report PHR on the earliest possible PUSCH, based on a monitoring/search time window defined in terms of a reported UE capability and/or gNB configuration or fixed timing threshold in the specification, which is potentially (much) less stringent that the aggressive PHR timeline described above. The PHR cut-off time is the reception time of the corresponding UL DCI/time-reference.
    Values for the UE capability between the first DCI and the min (k2) values/minimum PUSCH preparation time.
    Alternatively, the values for the UE capability varies between min (k2) values to max (k2) values; wherein min(.) and max(.) operators can be for each serving cell or over all serving cells.
  Balanced PHR timeline (version 2): report PHR on the earliest possible PUSCH, based on a monitoring/search time window defined in terms of the LCP timeline. The PHR cut-off time is the reception time of the corresponding UL DCI/time-reference.
  Reporting two/multiple PHRs: The UE reports a PHR for the PUSCH corresponding to the earliest UL DCI after the PHR trigger, but the UE is allowed to additionally report a second PHR for the out-of-order PUSCH that is scheduled later and occurs earlier.

Figure 5:
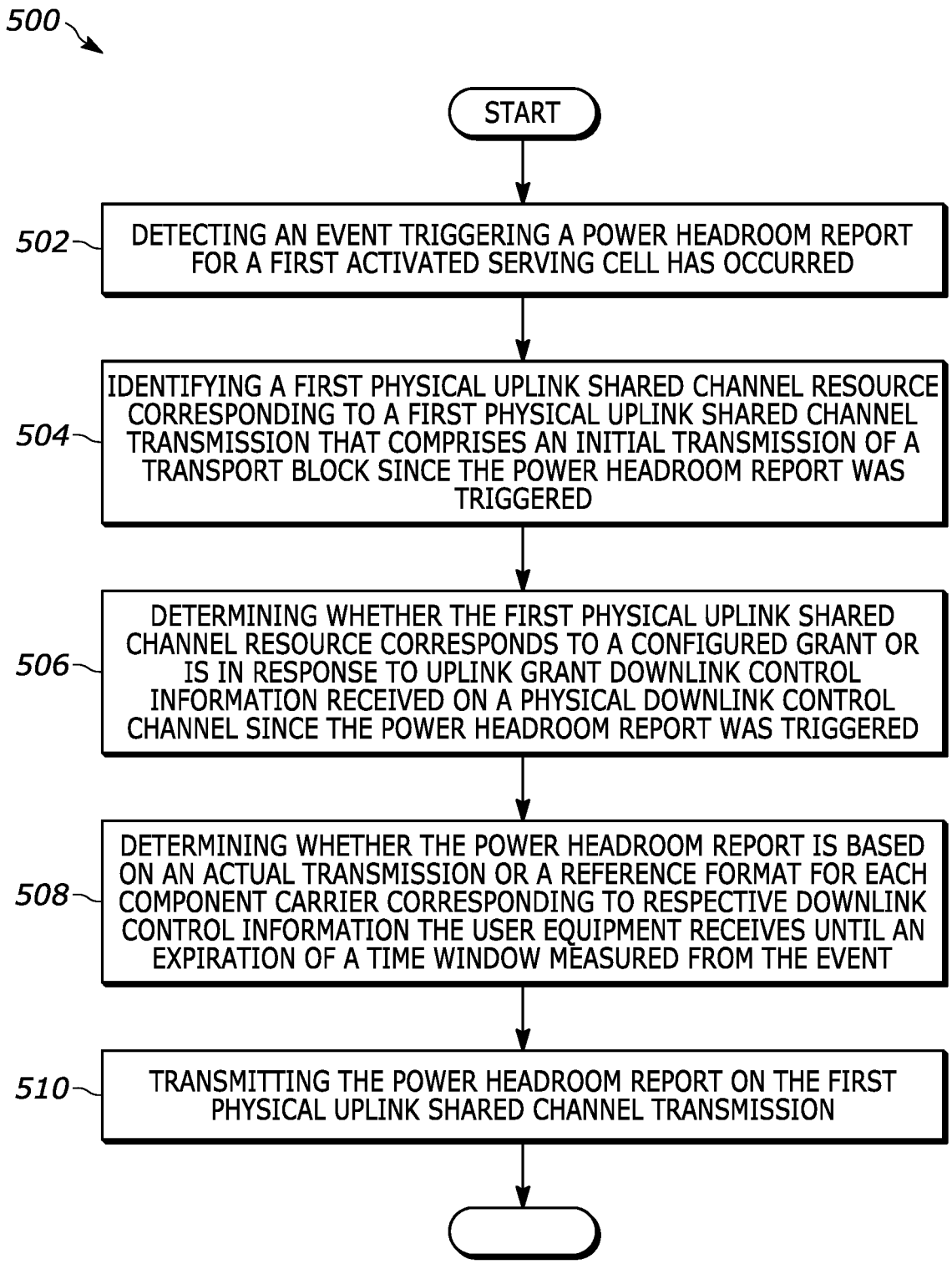
FIG. 5 is a flow diagram in a user equipment for determining the basis of a triggered power head room report.

FIG. 5 illustrates a flow diagram 500 of a method in a user equipment for determining the basis of a triggered power head room report. More specifically, the method includes detecting 502 that an event triggering a power headroom report for a first activated serving cell has occurred. A first physical uplink shared channel resource corresponding to a first physical uplink shared channel transmission is identified 504 that comprises an initial transmission of a transport block since the power headroom report was triggered. A determination 506 is made as to whether the first physical uplink shared channel resource corresponds to a configured grant or is in response to uplink grant downlink control information received on a physical downlink control channel since the power headroom report was triggered. Whether the power headroom report is based on an actual transmission or a reference format is determined 508 for each component carrier corresponding to respective downlink control information the user equipment receives until an expiration of a time window measured from the event. The power headroom report is then transmitted 510 on the first physical uplink shared channel transmission.

In some instances, identifying the first physical uplink shared channel resource can further include finding the first physical shared channel resource to be an earliest physical shared channel resource, wherein the physical uplink shared channel resource is scheduled by a downlink control information occurring at least after elapsing 'X' symbols from an earliest downlink control information reception scheduling an uplink transmission comprising the initial transmission of the transport block after the event was triggered. In some of these instances, 'X'>0 if the user equipment is enabled to receive an indication to cancel an already scheduled physical uplink shared channel transmission, otherwise 'X'=0.

In some instances, identifying the first physical uplink shared channel resource further comprises finding the first physical shared channel resource to be an earliest physical shared channel resource, wherein the physical uplink shared channel resource is determined based on a configured grant occurring at least after elapsing 'X' symbols from an earliest downlink control information reception scheduling an uplink transmission comprising the initial transmission of the transport block after the event was triggered.

In some instances, the time window can expire at a symbol having a first offset duration from a physical downlink control channel monitoring instance where the user equipment detects the uplink grant downlink control information; and wherein the time window expires after the physical downlink control channel monitoring instance. In some of these instances, the first offset duration can correspond to a predetermined number of symbols. In some of these instances, the first offset duration can correspond to a predetermined number of slots.

In some instances, the uplink grant downlink control information can be received on the physical downlink control channel since the power headroom report was triggered, based on the first physical uplink shared channel transmission corresponding to an uplink grant downlink control information received on a physical downlink control channel.

In some instances, the time window can expire at a first uplink symbol of the first physical uplink shared channel transmission minus a second offset duration, based on the first physical uplink shared channel transmission corresponding to a configured grant.

In some instances, the time window can expire at a first uplink symbol of the first physical uplink shared channel transmission minus a second offset duration, based on the first physical uplink shared channel transmission corresponding to the uplink grant downlink control information received on the physical downlink control channel. In some of these instances, the first physical uplink shared channel transmission can be on a second activated serving cell, and the second offset duration is a minimum downlink control channel-to-physical uplink shared channel time K2 value, which corresponds to a minimum delay between the uplink grant downlink control information and the scheduled first physical uplink shared channel that is associated with the second activated serving cell. In some of these instances, the first and the second activated serving cells can be the same cell. In some of these instances, the minimum downlink control channel-to-physical uplink shared channel time K2 value can be a minimum of one or more of a default, a common, or a dedicated configured downlink control channel-to-physical uplink shared channel time from one or more entries in a physical uplink shared channel time domain resource allocation table.

In other ones of these instances, the first physical uplink shared channel transmission can be on a second activated serving cell, and the second offset duration is a minimum value of the minimum K2 value associated with the first activated serving cell and the minimum K2 value associated with the second activated serving cell. In still other ones of these instances, the first physical uplink shared channel transmission can be on a second activated serving cell, and the second offset duration is a maximum K2 value associated with the first activated serving cell and the second activated serving cell. Further yet, the second offset duration can be determined based on capability information signaling of the user equipment, which is configured by higher processing layers in the user equipment, or is configured by a scheduling base station.

In some instances, the first physical uplink shared channel transmission that comprises the initial transmission of the transport block since the power headroom report was triggered can be an earliest physical uplink shared channel transmission since the power headroom report was triggered.

In some instances, the event triggering a power headroom report can include an expiration of a timer, which measures an amount of time that has elapsed since an immediately prior power head room report had been sent by the user equipment, or a change in path loss between the user equipment and the first activated serving cell, which exceeds a predetermined value has been detected.

In some instances, the method can further include detecting a further second event triggering a further power headroom report, wherein the second event is based upon a change in path loss exceeding a predetermined value between a time that the original earlier event was triggered and a time that the further second event was triggered, and prior to the power head room report associated with the original earlier event on the first physical uplink shared channel transmission is transmitted. A second physical uplink shared channel transmission, that comprises an initial transmission of a second transport block since the further headroom report was triggered can be determined, where the second physical uplink shared channel transmission starts earlier than the first physical uplink shared channel transmission. The further headroom report can be transmitted on the second physical uplink shared channel transmission. In some of these instances, the second physical uplink shared channel transmission can correspond to a configured grant. In other of these instances, the second physical uplink shared channel transmission can correspond to a low latency transmission, and the first physical uplink shared channel transmission corresponds to a normal latency transmission, wherein the low latency transmission has tighter latency requirements compared to that of the normal latency transmission. Further, the second physical uplink shared channel transmission can be scheduled by a physical downlink control channel with cyclic redundancy check scrambled by modulation coding scheme cell radio network temporary identifier.

Figure 6:
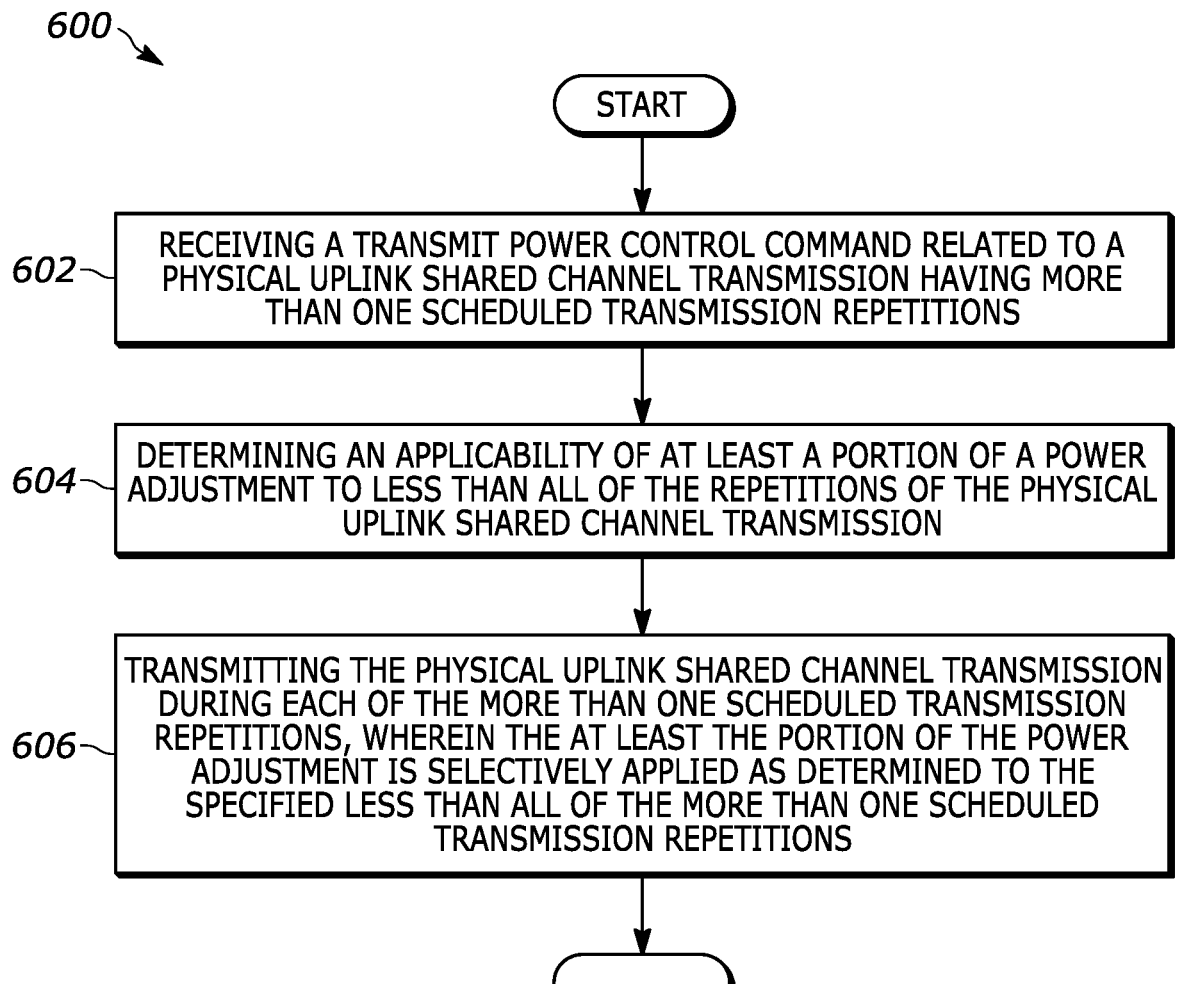
FIG. 6 is a flow diagram in a user equipment for selectively applying the power adjustment of a transmit power control command.

FIG. 6 illustrates a flow diagram 600 of a method in a user equipment for selectively applying the power adjustment of a transmit power control command. More specifically, the method includes receiving 602 a transmit power control command related to a physical uplink shared channel transmission having more than one scheduled transmission repetitions. An applicability of at least a portion of a power adjustment to less than all of the repetitions of the physical uplink shared channel transmission is determined 604. The physical uplink shared channel transmission is transmitted 606 during each of the more than one scheduled transmission repetitions, wherein the at least the portion of the power adjustment is selectively applied as determined to the specified less than all of the more than one scheduled transmission repetitions.

In some instances, the more than one scheduled transmission repetitions can include mini-slot repetition. In other instances, the more than one scheduled transmission repetitions can include multi-segment transmission(s).

In some instances, the transmit power control command can be augmented with an indication, and the applicability of the at least the portion of the power adjustment in the received transmit power control command can be determined for less than all of the repetitions of the physical uplink shared channel transmission based on the indication.

In some instances, the less than all of the repetitions of the physical uplink shared channel transmissions that the at least the portion of the power adjustment can be applied to is a first one of the more than one scheduled transmission repetitions.

In some instances, the transmit power control command can include a field, which indicates a transmit power of which ones of the more than one scheduled transmission repetitions are to be adjusted.

In some instances, application of the power adjustment associated with the transmit power command can be limited to the more than one scheduled transmission repetitions within a slot corresponding to the received transmit power control command.

In some instances, the transmit power control command can include a field, which indicates whether the transmit power control command is applied to all of the repetitions of the physical uplink shared channel transmission or the transmit power control command is applied to the repetitions of the physical uplink shared channel transmission being in a first scheduled uplink slot of the repetitions of the physical uplink shared channel transmission.

In some instances, the transmit power control command can be received via a physical downlink control channel.

In some instances, the power adjustment can include a temporary additional transmission power boost associated with the physical uplink shared channel transmission including the specified more than one scheduled transmission repetitions. In some of these instances, the temporary additional transmission power boost can be of a predetermined amount.

In some instances, the power adjustment can include an amount of power adjustment to be applied to an accumulated amount of power adjustment, which is reflective of power adjustments across more than one transmit power control commands. In some of these instances, the accumulated amount of power adjustment is not increased from the accumulated amount of power adjustment corresponding to a previous physical uplink shared channel transmission if a maximum transmission power is reached at the previous physical uplink shared channel transmission. In other of these instances, the accumulated amount of power adjustment may be increased from the accumulated amount of power adjustment corresponding to a previous physical uplink shared channel transmission if a maximum transmission power is reached at the previous physical uplink shared channel transmission.

In some instances, a downlink symbol coinciding within a repetition of the more than one scheduled transmission repetitions can result in a postponement of one or more of the more than one scheduled transmission repetitions. In some of these instances, the at least a portion of an included power adjustment is not applied to a postponed repetition. In other of these instances, the at least the portion of the power adjustment is not applied to any of the more than one scheduled transmission repetitions, that are postponed to a new slot.

In some instances, a set of the more than one scheduled transmission repetitions sharing same demodulation reference signal symbols can have a same transmission power.

In some instances, a second indication can be received as part of a separate subsequently received transmit power command, wherein the second indication modifies a transmission power for a subset of the more than one scheduled transmission repetitions.

In some instances, the transmit power command can be received from a network base station.

Figure 7:
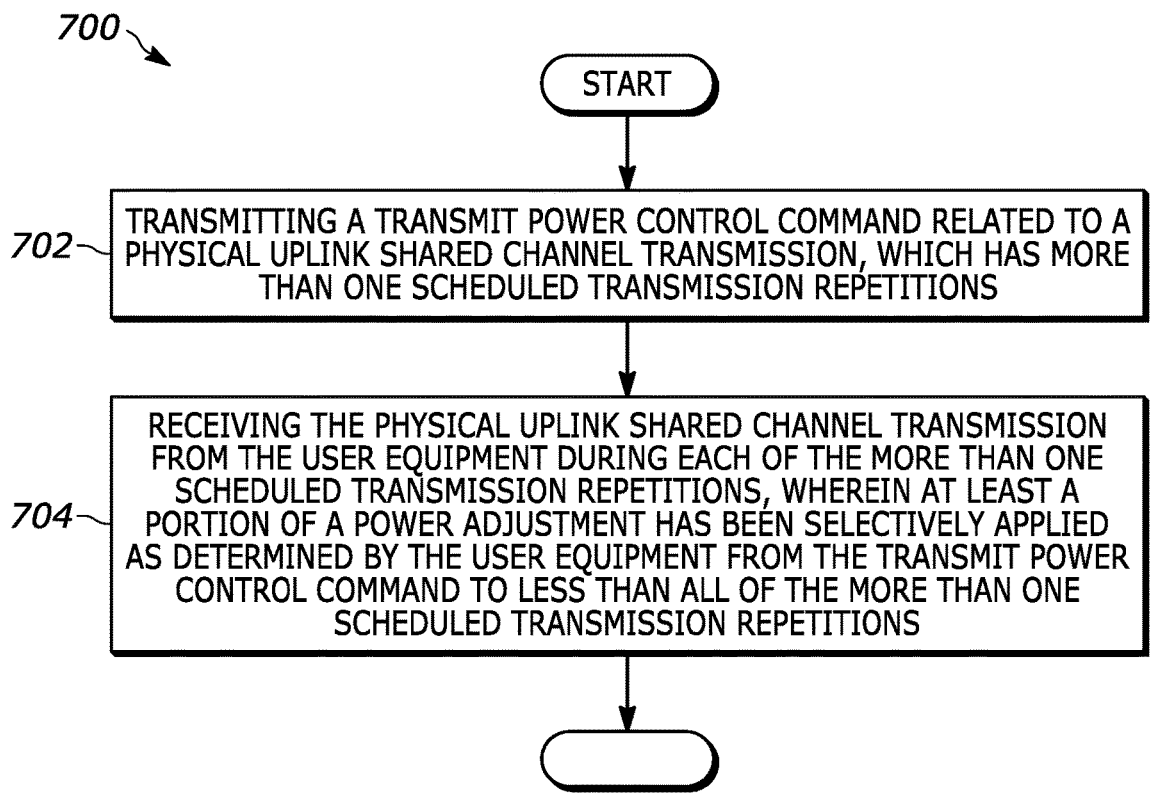
FIG. 7 is a flow diagram in a network entity associated with the application of the power adjustment of a transmit power control command.

FIG. 7 illustrates a flow diagram 700 of a method in a network entity associated with the application of the power adjustment of a transmit power control command. More specifically, the method includes transmitting 702 a transmit power control command related to a physical uplink shared channel transmission, which has more than one scheduled transmission repetitions. The physical uplink shared channel transmission is received 704 from the user equipment during each of the more than one scheduled transmission repetitions, wherein at least a portion of a power adjustment has been selectively applied as determined by the user equipment from the transmit power control command to less than all of the more than one scheduled transmission repetitions.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 8:
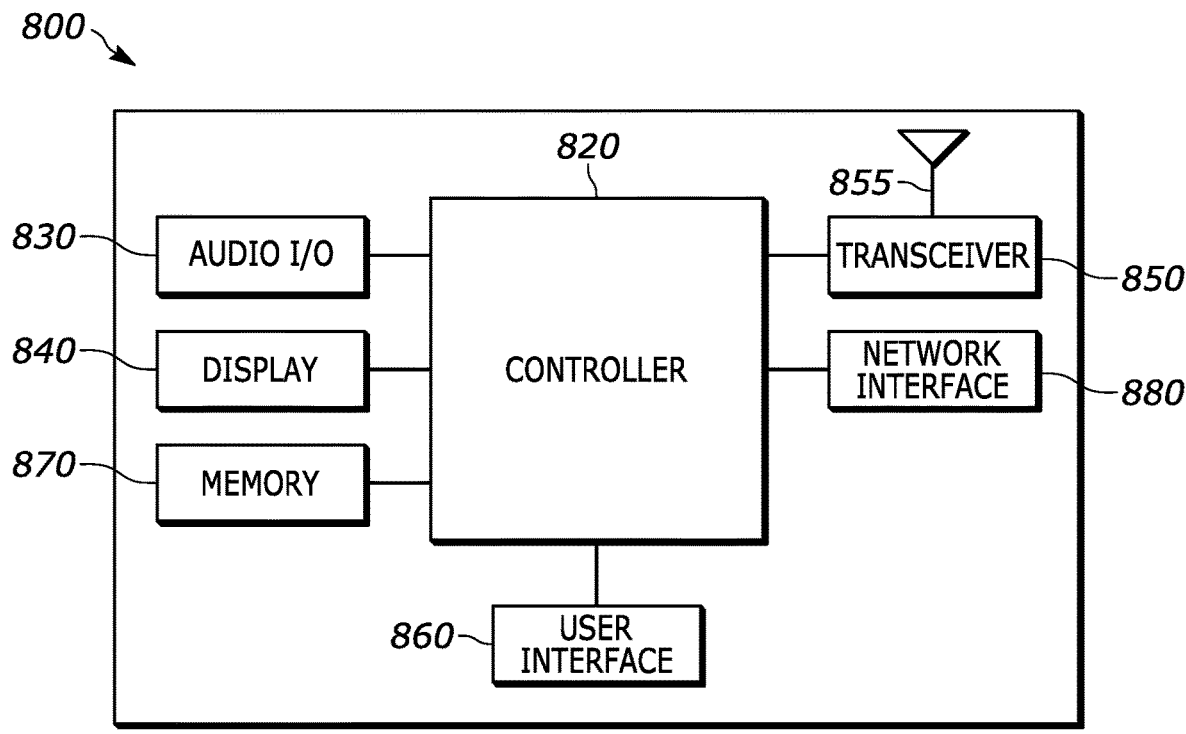
FIG. 8 is an example block diagram of an apparatus according to a possible embodiment.

FIG. 8 is an example block diagram of an apparatus 800, such as the wireless communication device 110, according to a possible embodiment. The apparatus 800 can include a housing 810, a controller 820 within the housing 810, audio input and output circuitry 830 coupled to the controller 820, a display 840 coupled to the controller 820, a transceiver 850 coupled to the controller 820, an antenna 855 coupled to the transceiver 850, a user interface 860 coupled to the controller 820, a memory 870 coupled to the controller 820, and a network interface 880 coupled to the controller 820. The apparatus 800 can perform the methods described in all the embodiments The display 840 can be a viewfinder, a liquid crystal display (LCD), a light emitting diode (LED) display, a plasma display, a projection display, a touch screen, or any other device that displays information. The transceiver 850 can include a transmitter and/or a receiver. The audio input and output circuitry 830 can include a microphone, a speaker, a transducer, or any other audio input and output circuitry. The user interface 860 can include a keypad, a keyboard, buttons, a touch pad, a joystick, a touch screen display, another additional display, or any other device useful for providing an interface between a user and an electronic device. The network interface 880 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 870 can include a random access memory, a read only memory, an optical memory, a solid state memory, a flash memory, a removable memory, a hard drive, a cache, or any other memory that can be coupled to an apparatus.

The apparatus 800 or the controller 820 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 870 or elsewhere on the apparatus 800. The apparatus 800 or the controller 820 may also use hardware to implement disclosed operations. For example, the controller 820 may be any programmable processor.

Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 820 may be any controller or processor device or devices capable of operating an apparatus and implementing the disclosed embodiments. Some or all of the additional elements of the apparatus 800 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method of wireless communication at a network entity, the method comprising:
    transmitting a transmit power control command associated with a physical uplink shared channel transmission, the physical uplink shared channel transmission repeating over a set of uplink transmission occasions; and
    receiving the physical uplink shared channel transmission during the set of uplink transmission occasions, wherein the physical uplink shared channel transmission received during a subset of uplink transmission occasions of the set of uplink transmission occasions corresponds to an adjusted transmit power associated with the transmit power control command.

2. The method of claim 1, wherein the transmit power control command is augmented with an indication, and wherein the indication identifies an applicability of at least a portion of a power adjustment to the subset of uplink transmission occasions of the set of uplink transmission occasions of the physical uplink shared channel transmission.

3. The method of claim 2, wherein the subset of uplink transmission occasions of the set of uplink transmission occasions of the physical uplink shared channel transmission that the at least the portion of the power adjustment is applicable to includes a first uplink transmission occasion of the set of uplink transmission occasions.

4. The method of claim 1, wherein the transmit power control command includes a field that indicates a transmit power of uplink transmission occasions of the set of uplink transmission occasions that are to be adjusted.

5. The method of claim 1, wherein application of the adjusted transmit power associated with the transmit power control command is limited to the set of uplink transmission occasions within a slot corresponding to the transmit power control command.

6. The method of claim 1, wherein the transmit power control command includes a field that indicates whether the transmit power control command is applied to all uplink transmission occasions of the set of uplink transmission occasions of the physical uplink shared channel transmission or the transmit power control command is applied to one or more uplink transmission occasions of the set of uplink transmission occasions of the physical uplink shared channel transmission that are in a first scheduled uplink slot of the set of uplink transmission occasions of the physical uplink shared channel transmission.

7. The method of claim 1, wherein the transmit power control command is transmitted via a physical downlink control channel.

8. The method of claim 1, wherein the adjusted transmit power includes a temporary additional transmission power boost associated with the physical uplink shared channel transmission including the set of uplink transmission occasions.

9. The method of claim 8, wherein the temporary additional transmission power boost is of a predetermined amount.

10. The method of claim 1, wherein the adjusted transmit power includes an amount of power adjustment to be applied to an accumulated amount of power adjustment, which is reflective of power adjustments across more than one transmit power control commands.

11. The method of claim 10, wherein the accumulated amount of power adjustment is not increased from the accumulated amount of power adjustment corresponding to a previous physical uplink shared channel transmission if a maximum transmission power is reached.

12. The method of claim 10, wherein the accumulated amount of power adjustment is increased from the accumulated amount of power adjustment corresponding to a previous physical uplink shared channel transmission if a maximum transmission power is not reached at the previous physical uplink shared channel transmission.

13. The method of claim 1, wherein a downlink symbol coinciding within an occasion of the set of uplink transmission occasions results in a postponement of one or more of the set of uplink transmission occasions.

14. The method of claim 13, wherein the adjusted transmit power associated with the transmit power control command is not applied to any uplink transmission occasions of the set of uplink transmission occasions that are postponed to a new slot.

15. The method of claim 1, wherein a subset of the set of uplink transmission occasions sharing same demodulation reference signal symbols have a same transmission power.

16. The method of claim 1, wherein a second indication is transmitted as part of a separate subsequently transmitted transmit power command, and wherein the second indication modifies a transmission power for a subset of the set of uplink transmission occasions.

17. A network entity for communicating with a user equipment, the network entity comprising:
   a controller; and
   a transceiver, coupled to the controller, that transmits a transmit power control command associated with a physical uplink shared channel transmission, the physical uplink shared channel transmission repeating over a set of uplink transmission occasions, and receives the physical uplink shared channel transmission during the set of uplink transmission occasions, wherein the physical uplink shared channel transmission received during a subset of uplink transmission occasions of the set of uplink transmission occasions corresponds to an adjusted transmit power associated with the transmit power control command.

18. The network entity of claim 17, wherein the transmit power control command is augmented with an indication, and wherein the indication identifies an applicability of at least a portion of a power adjustment to the subset of uplink transmission occasions of the set of uplink transmission occasions of the physical uplink shared channel transmission.

19. The network entity of claim 18, wherein the subset of uplink transmission occasions of the set of uplink transmission occasions of the physical uplink shared channel transmission that the at least the portion of the power adjustment is applicable to includes a first uplink transmission occasion of the set of uplink transmission occasions.

20. The network entity of claim 17, wherein the transmit power control command includes a field that indicates a transmit power of uplink transmission occasions of the set of uplink transmission occasions that are to be adjusted.

* * * * *